(12) United States Patent
Sherman

(10) Patent No.: US 10,484,186 B2
(45) Date of Patent: *Nov. 19, 2019

(54) CASCADING MULTIVARIATE QUADRATIC IDENTIFICATION SCHEMES FOR CHAIN OF TRUST

(71) Applicant: Intel Corporation, Santa Clara, CA (US)

(72) Inventor: Brent M. Sherman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 378 days.

This patent is subject to a terminal disclaimer.

(21) Appl. No.: 15/281,262

(22) Filed: Sep. 30, 2016

(65) Prior Publication Data

US 2018/0097614 A1 Apr. 5, 2018

(51) Int. Cl.
*H04L 9/32* (2006.01)
*H04L 9/00* (2006.01)
*G06F 21/57* (2013.01)

(52) U.S. Cl.
CPC .......... *H04L 9/3271* (2013.01); *G06F 21/572* (2013.01); *H04L 9/007* (2013.01); *H04L 9/3218* (2013.01); *G06F 2221/2103* (2013.01)

(58) Field of Classification Search
CPC .................................................. H04L 9/3271
USPC ........................................................ 713/189
See application file for complete search history.

(56) References Cited

U.S. PATENT DOCUMENTS

| 9,189,617 | B2 | 11/2015 | Sherman | |
|---|---|---|---|---|
| 9,949,115 | B2* | 4/2018 | Avanzi | H04L 9/302 |
| 2013/0073855 | A1* | 3/2013 | Kipnis | H04L 9/3093 |
| | | | | 713/171 |
| 2014/0153717 | A1* | 6/2014 | Sakumoto | H04L 9/3093 |
| | | | | 380/44 |
| 2014/0215222 | A1* | 7/2014 | Sakumoto | H04L 9/3252 |
| | | | | 713/176 |

(Continued)

OTHER PUBLICATIONS

Koichi Sakumoto, Taizo Shirai, and Harunaga Hiwatari; "Public-Key Identification Schemes Based on Multivariate Quadratic Polynomials" published by Sony Corporation May 1, 2012 Kitashinagawa Shinagawa-ku, Tokyo 141-0001, Japan {Koichi.Sakumoto,Taizo. Shirai,Harunaga.Hiwatari}@jp.sony.com in 2011 (Year: 2011).*

(Continued)

*Primary Examiner* — Khalil Naghdali
(74) *Attorney, Agent, or Firm* — Trop, Pruner & Hu, P.C.

(57) ABSTRACT

A method, computing system, and computer-readable medium comprising instructions to establish a chain of trust for components of a computing environment. A respective public/private key pair is generated using a multivariate quadratic function F for each component of the computing environment. In response to a challenge from a verifier, a current prover component sends a response that the verifier uses to determine whether to trust the current prover component. The response may include a first commitment value and a second commitment value, which are determined for the current prover component using a public key of a previous prover component. At least one of the first and second commitment values can be determined using a polar function G, which is a polar form of the multivariate quadratic function F.

15 Claims, 13 Drawing Sheets

(56) References Cited

U.S. PATENT DOCUMENTS

| | | | | |
|---|---|---|---|---|
| 2014/0380062 A1* | 12/2014 | Sakumoto | ............. | H04L 9/3247 713/189 |
| 2015/0100794 A1* | 4/2015 | Joye | ........................ | H04L 9/008 713/189 |
| 2015/0317481 A1* | 11/2015 | Gardner | ................ | H04L 9/3278 726/2 |
| 2018/0034630 A1* | 2/2018 | Rietman | ............... | H04L 9/3093 |

OTHER PUBLICATIONS

Feng et al. "A New Public Key Signature Scheme based on Quadratic Polynomials"; 2012 Fourth International Conference on Multimedia Information Networking and Security Apr. 12, 2013 IEEE pp. 8-11 (Year: 2012).*

Sakumoto, et al., "Public-Key Identification Schemes Based on Multivariate Quadratic Polynomials", Sony Corporation, 2011, 18 pages, May 1, 2012 Kitashinagawa Shinagawa-ku, Tokyo 141-0001, Japan.

* cited by examiner

| Steps | Verifier | Provers | | |
|---|---|---|---|---|
| | Application (i=4) 830 | Middleware (i=3) 840 | USB Driver (i=2) 850 | Keyboard FW (i=1) 860 |
| | | | Setup/Boot | |
| 802 | | | | Generate $s_1$, $r_0$, $t_0$, $e_0$, $r_1$, $t_1$, $e_1$, $c_0$, $c_1$, $c_2$, $v_1$, $v_0=1$ when root (i=1) |
| 804 | | | Generate $s_2$, $r_0$, $t_0$, $e_0$, $r_1$, $t_1$, $e_1$, $c_0$, $c_1$, $c_2$, $v_2$ | ← Send ($c_0$, $c_1$, $c_2$, $v_1$, $v_0$) |
| 806 | | Generate $s_3$, $r_0$, $t_0$, $e_0$, $r_1$, $t_1$, $e_1$, $c_0$, $c_1$, $c_2$, $v_3$ | ← Send ($c_0$, $c_1$, $c_2$, $v_2$, $v_1$) | |
| 808 | | ← Send ($c_0$, $c_1$, $c_2$, $v_3$, $v_2$) | | |
| | | | Verification | |
| 812 | Generate challenge ($ch_4$) and send ↑ | | | |
| 814 | | Send challenge, either: 1. $ch_3 = new$ 2. $ch_3 = ch_4$ ↑ | | |
| 816 | | | Send challenge, either: 1. $ch_2 = new$ 2. $ch_2 = ch_3$ ↑ | |
| 818 | | | Verify $ch_2$ using ($Rsp_1$, $v_1$, $v_0$). If not verified, $Rsp_2 = 0$ to break the chain, else generate $Rsp_2$ accordingly. | ← Send response ($Rsp_1$) to $ch_2$ |
| 820 | | Verify $ch_3$ using ($Rsp_2$, $v_2$, $v_1$). If not verified, $Rsp_3 = 0$ to break the chain, else generate $Rsp_3$ accordingly. | ← Send response ($Rsp_2$) to $ch_3$ | |
| 822 | Verify $ch_4$ using ($Rsp_3$, $v_3$, $v_2$). If verified then chain is trusted, else stop. | ← Send response ($Rsp_3$) to $ch_4$ | | |

Figure 8

| Steps | Verifier | Provers | | |
|---|---|---|---|---|
| | Application 930 | Middleware (i=3) 940 | USB Driver (i=2) 950 | Keyboard FW (i=1) 960 |
| | | Setup/Boot | | |
| 902 | | | | Generate $s_1, r_0, t_0, e_0, r_1, t_1, e_1, c_0, c_1, c_2, v_1$ ($v_0 = 1$ when root (i=1)) |
| 904 | | | Generate $s_2, r_0, t_0, e_0, r_1, t_1, e_1, c_0, c_1, c_2, v_2$ | ← Send ($c_0, c_1, c_2, v_1, v_0$) |
| 906 | | Generate $s_3, r_0, t_0, e_0, r_1, t_1, e_1, c_0, c_1, c_2$ | ← Send ($c_0, c_1, c_2, v_2, v_0$) | |
| 908 | | ← Send ($c_0, c_1, c_2, v_3, v_2$) | | |
| | | Verification | | |
| 912 | Generate challenge ($ch_4 = 1$) and send | → | | |
| 914 | | Generate challenge ($ch_3 = 1$) and send | → | |
| 916 | | | Generate challenge ($ch_2 = 1$) and send | → |
| 918 | | | Verify: $c_0 = Com(r_1, v_1 - F(r_1) - G(t_1, r_1) - e_1, v_0)$ $c_1 = Com(t_1, e_1, v_0)$ If not verified, $Rsp_2 = 0$ to break the chain, else generate $Rsp_2$ using this node's own local values. | ← Send response $Rsp_1$: $r_1, t_1, e_1$ |
| 920 | | Verify: $c_0 = Com(r_1, v_2 - F(r_1) - G(t_1, r_1) - e_1, v_1)$ $c_2 = Com(t_1, e_1, v_1)$ If not verified $Rsp_3 = 0$ to break the chain, else generate $Rsp_3$ using this node's own local values. | ← Send response $Rsp_2$: $r_1, t_1, e_1$ | |
| 922 | Verify: $c_0 = Com(r_1, v_3 - F(r_1) - G(t_1, r_1) - e_1, v_2)$ $c_2 = Com(t_1, e_1, v_2)$ If verified then chain is trusted, else stop. | ← Send response: $r_1, t_1, e_1$ | | |

FIG. 9

CASCADING MULTIVARIATE QUADRATIC IDENTIFICATION SCHEMES FOR CHAIN OF TRUST

TECHNICAL FIELD

Embodiments relate to security of computing environments, and in particular, to establishing a chain of trust between components of computing environments.

BACKGROUND

This patent application builds upon a public-key identification scheme presented in the 2011 paper by Koichi Sakumoto, Taizo Shirai, and Harunaga Hiwatari, entitled "Public-Key Identification Schemes Based on Multivariate Quadratic Polynomials," available at https://www.iacr.org/archive/crypto2011/68410703/68410703.pdf, which is referred to herein as "Sakumoto."

A trusted computing base (TCB) of a computer system has been described as "the set of all hardware, firmware, and/or software components that are critical to its security, in the sense that bugs or vulnerabilities occurring inside the TCB might jeopardize the security properties of the entire system. By contrast, parts of a computer system outside the TCB must not be able to misbehave in a way that would leak any more privileges than are granted to them in accordance to the security policy.

The careful design and implementation of a system's trusted computing base is paramount to its overall security. . . . Modern operating systems strive to reduce the size of the TCB so that an exhaustive examination of its code base (by means of manual or computer-assisted software audit or program verification) becomes feasible." (Source: https://en.wikipedia.org/wiki/Trusted_computing_base, visited Aug. 25, 2016.)

Security of the TCB can be implemented via a "chain of trust." A chain of trust is established by validating each layer of hardware and software, beginning with the hardware and iteratively validating each firmware and software component that is loaded into memory. A chain of trust is typically established during a boot of the computer system. The chain of trust begins with a trust anchor, such as the hardware of the computing system, which is trusted because the hardware will only boot from firmware or software that is digitally signed. A digital signature is a mathematical scheme for demonstrating the authenticity of a digital message or document. A valid digital signature gives a recipient reason to believe that the message was created by a known sender, that the sender cannot deny having sent the message (authentication and non-repudiation), and that the message was not altered in transit (integrity).

The signing authority for firmware and/or software will only sign boot programs that enforce security, such as only running programs that are themselves signed, or only allowing signed code to have access to certain features of the computing system. The establishment of a chain of trust may continue through several software layers. Each component of a computing system assumes trust of its predecessor component (i−1) and measures the integrity of its successor component (i+1) before relinquishing control to the successor component. This process repeats iteratively until all components of the computing system's code base are trusted.

The validation that occurs as each component of the TCB is loaded into memory depends upon the security of the digital signatures of the components. Digital signature schemes are typically based on public key (asymmetric) cryptography which uses pairs of keys. In a key pair, the public key, which may be disseminated widely, is paired with a private key, which is known only to the owner. The authenticity of a signature generated from a fixed message and fixed private key can be verified by using the corresponding public key.

A digital signature scheme typically consists of three algorithms: (1) A key generation algorithm selects a private key uniformly at random from a set of possible private keys. The algorithm outputs the private key and a corresponding public key. (2) A signing algorithm receives a message and a private key and produces a digital signature. A recipient of the message uses the public key to authenticate that the message originated with a holder of the paired private key. (3) A signature verifying algorithm receives a message, public key and signature, and either accepts or rejects the message's claim to authenticity (i.e., that the message originated with a holder of the paired private key).

Modern cryptography is heavily based on mathematical theory and computer science practice; cryptographic algorithms are designed around computational hardness assumptions, making such algorithms hard to break in practice by any adversary. It is theoretically possible to break such a system, but it is infeasible to do so by any known practical means. For example, public key cryptography is based upon the assumption that it is computationally infeasible to generate a valid signature for a party without knowing that party's private key.

The security of public key cryptographic systems is based upon the computational infeasibility of certain mathematical calculations. For example, integer factorization is the decomposition of a composite number into a product of smaller integers. If these integers are further restricted to prime numbers, the process is called prime factorization. Integer factorization is believed to be computationally infeasible with an ordinary computer for large integers if they are the product of few prime numbers (e.g., products of two 300-digit primes).

By comparison, a quantum computer could efficiently solve the prime factorization problem using, for example, an algorithm such as Shor's algorithm to find the prime factors of a given integer. This ability would allow a quantum computer to decrypt many of the cryptographic systems in use today, in the sense that there would be a polynomial time (in the number of digits of the integer) algorithm for solving the problem. In particular, most of the popular public key ciphers are based on the difficulty of factoring integers or the discrete logarithm problem, both of which can be solved by Shor's algorithm. In particular, the RSA, Diffie-Hellman, and Elliptic curve Diffie-Hellman algorithms could be broken. These algorithms are currently used to protect secure Web pages, encrypted email, and many other types of data. Breaking these algorithms would have significant ramifications for electronic privacy and security.

BRIEF DESCRIPTION OF THE DRAWINGS

FIG. 8 shows an example communication sequence between the components of the computer system of FIG. 1 in accordance with the communication protocol of FIG. 6.

FIG. 9 shows another example communication sequence between the components of the computer system of FIG. 1 in accordance with the communication protocol of FIG. 6.

DETAILED DESCRIPTION

The computing industry has predicted that quantum computing will become a mainstream reality sometime around 2025. If this prediction comes to fruition, existing public key infrastructure (PKI) algorithms will no longer uphold their security claims. Therefore, the computer security research community is focusing on discovery of algorithms that are resistant to quantum computing. This research has discovered a technique using multivariate quadratic polynomials to create private-public key pairs. The present application expands upon the public-key identification schemes presented by Sakumoto, et al. in the paper referenced in of the Background of this patent application.

Figure 1:
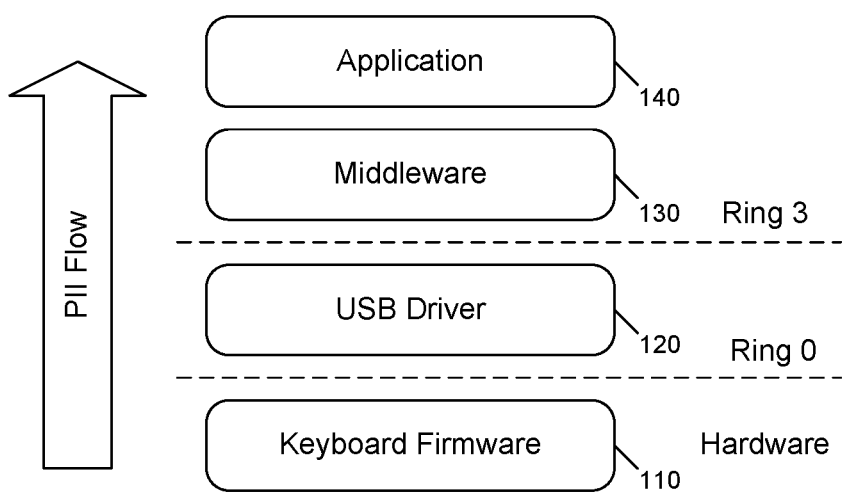
FIG. 1 is a diagram showing the flow of personally-identifiable information through components of a computer system.

FIG. 1 is a diagram showing the flow of personally-identifiable information through components of a computer system. At any time, a component might need to verify the integrity and/or authenticity of an existing system. For example, an application might need to collect personally identifiable information (PII) from a user. However, before collecting the PII, the application may need to ensure that the underlying components have not been compromised or replaced. The computer system's path of collection of the PII through layers of components is shown in FIG. 1.

FIG. 1 shows four different components of a computer system, with personally identifiable information flowing from a hardware layer through a protection ring layer 0 and a protection ring layer 3. A protection ring is one of two or more hierarchical levels or layers of privilege within the architecture of a computer system. The protection rings facilitate the operating system in providing different levels of access to resources. These privilege levels are generally hardware-enforced by some CPU architectures that provide different CPU modes at the hardware or microcode level. Rings are arranged in a hierarchy from most privileged (most trusted, usually numbered zero) to least privileged (least trusted, usually with the highest ring number).

On most operating systems, the innermost ring (typically referred to as ring zero (0)) is the level with the most privileges and interacts most directly with the physical hardware such as the CPU and memory. In each ring outside ring 0, programs have increasingly less access to the hardware and increasingly more restrictions on their behavior. Programs in the outermost ring (typically ring 3) are the least powerful, although ring 3 programs can accomplish any task provided that a ring 0 program handles the hardware accesses on behalf of the ring 3 program. Typically, the highest ring is used for application programs, whereas most of the operating system runs in ring 0, as do portions of many third-party device drivers and certain other kinds of modules. In many operating systems, only the two privilege levels corresponding to rings 0 and 3 are used.

Referring to FIG. 1, personally-identifiable information flows from keyboard firmware 110 at the hardware level, through a USB driver 120 at a ring 0 privilege level, and through middleware 130 and application 140 at a ring 3 privilege level. The following sections describe techniques for establishing a chain of trust between these components in a manner that is resistant to breakage by a quantum computer.

Figure 2:
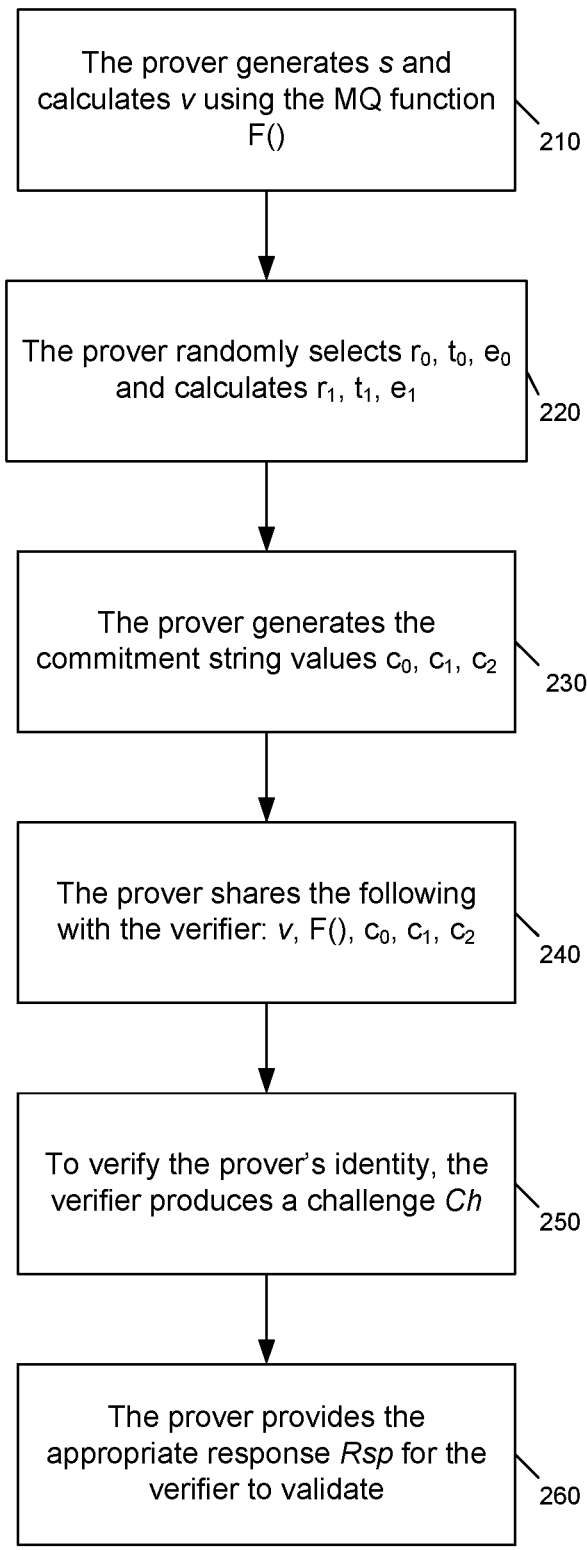
FIG. 2 is a flowchart of a method for computing and verifying a public and private key pair using a multivariate quadratic polynomial function.
Figure 3:
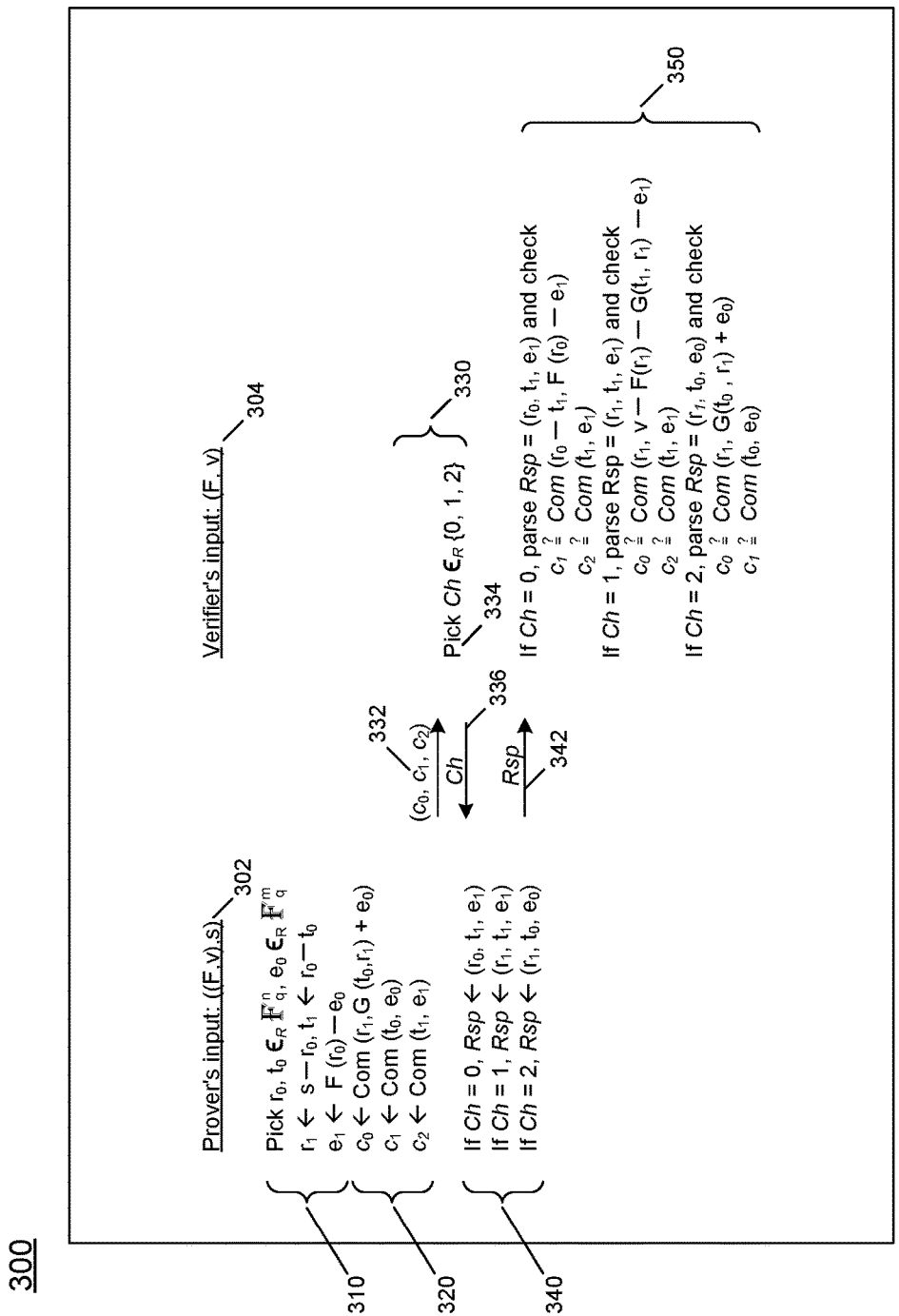
FIG. 3 shows a communication protocol between a prover and a verifier in performing the method of FIG. 2.
Figure 4:
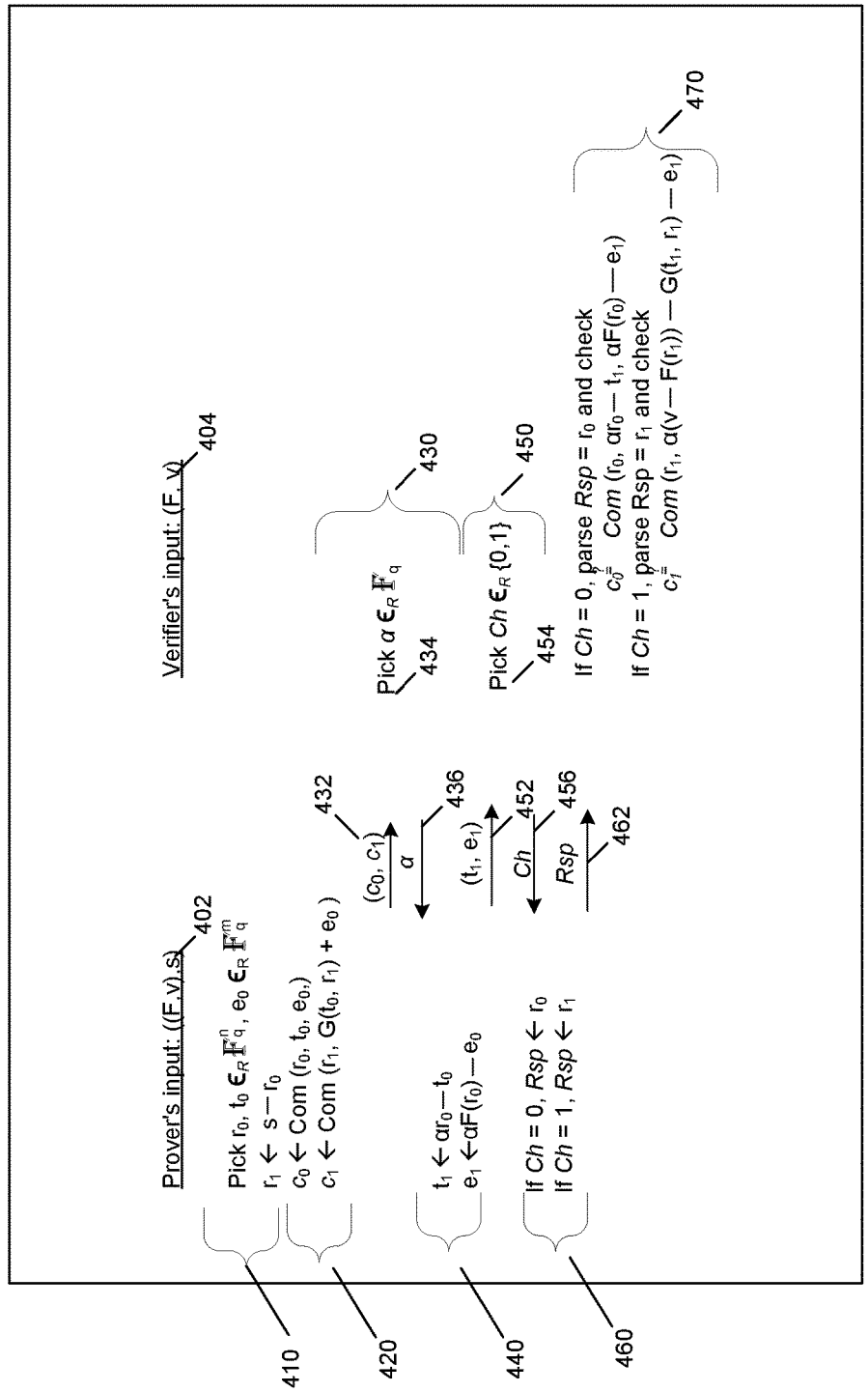
FIG. 4 shows a second communication protocol between a prover and a verifier in performing the method of FIG. 2.

FIGS. 2 through 4 are diagrams describing a public-key identification scheme presented in the paper presented by Koichi Sakumoto, Taizo Shirai, and Harunaga Hiwatari, entitled "Public-Key Identification Schemes Based on Multivariate Quadratic Polynomials," available at https://www.iacr.org/archive/crypto2011/68410703/68410703.pdf, which is referred to herein as "Sakumoto." The present application expands the public-key identification scheme of Sakumoto to build a chain of trust between components of a computing environment.

Terminology used in Sakumoto is provided in Table 1 below.

| Term | Definition |
| --- | --- |
| s | Secret (i.e., private key) chosen randomly in a field $\mathbb{F}$ of n-bits. |
| v | Public key (v = F(s)) in the field of m-bits |
| F( ) | Multivariate Quadratic function. (Note: the stylized character $\mathbb{F}$ is used herein to represent field $\mathbb{F}$, as shown above, to avoid confusion with F( ), the multivariable quadratic function.) |
| G( ) | Polar form of F( ) which is defined as G(x, y) = F(x + y) − F(x) − F(y) |
| Com | String commitment function (i.e., hash algorithm such as SHA2, SHA3, etc.). |

FIG. 2 is a flowchart of a method for computing and verifying a public and private key pair using a multivariate quadratic polynomial function, as described in Sakumoto. In block 210, a prover generates s, which is a secret (i.e., private key), and calculates a public key v from the secret s using the multivariate quadratic function F( ).

In block 220, the prover randomly selects three values $r_0$, $t_0$, and $e_0$ and calculates $r_1$, $t_1$, and $e_1$. The resulting values ($r_0$, $r_1$, $t_0$, $t_1$, $e_0$, $e_1$) enable a prover and verifier to confirm the identity of the prover without revealing the secret s. A prover first divides her secret s into shares $r_0$ and $r_1$, where s=($r_0$+$r_1$), where $r_0$ is a randomly selected value and $r_1$ is the value of s when $r_0$ is "subtracted" from s. Further details about the calculation of $r_1$ are provided below with reference to FIG. 3. Public key v=F(s) can be represented as v=F($r_0$+$r_1$), which can be represented as v=F($r_0$)+F($r_1$)−G($r_0$, $r_1$), using the polar form G of F. However, this representation still contains the term G($r_0$, $r_1$), which depends on both $r_0$ and $r_1$ (both shares of the secret s). This problem is addressed by further dividing $r_0$=$t_0$+$t_1$, and dividing F($r_0$)=$e_0$+$e_1$. The public key v=F($r_0$+$r_1$) can be divided into (G($t_0$, r1)+$e_0$) (F($r_1$) $r_1$)+$e_1$), due to the bilinearity of G. Each of the two parts is represented by either a tuple ($r_1$, $t_0$, $e_0$) or a tuple ($r_1$, $t_1$, $e_1$), while no information on the secret key s can be obtained from only one of the two tuples. Possession of one of the two tuples can be used by a prover to verify that it has possession of both shares $r_0$ and $r_1$ of the secret s. Subsequent functions of the verification process are described below.

In block 230, the prover generates commitment string values $c_0$, $c_1$, and $c_2$ using a string commitment function with input parameters of a string and a random string, such as one of the random values $r_0$, $t_0$, and $e_0$. The calculation of the values $c_0$, $c_1$, and $c_2$ is explained further with reference to FIG. 3 below.

In block 240, the prover shares v, F(s), $c_0$, $c_1$, and $c_2$ with a verifier to verify the prover's identity. In block 250, the verifier produces a challenge Ch to verify the prover's identity. In block 260, the prover provides a response Rsp for the verifier to validate.

FIG. 3 shows a communication protocol between a prover and a verifier in performing the method of FIG. 2. The basic idea for the communication protocol of FIG. 3 is that a prover proves that she has a tuple ($r_0$, $r_1$, $t_0$, $t_1$, $e_0$, $e_1$) satisfying the following two equations:

$$G(t_0, r_1) + e_0 = v - F(r_1) - G(t_1, r_1) - e_1 \quad (1) \text{ and}$$

$$(t_0, e_0) = (r_0 - t_1, F(r_0) - e_1). \quad (2)$$

If the tuple satisfies equations (1) and (2), then $v = F(r_0 + r_1) = F(s)$. Note that G is the polar form of F. In the communication protocol, corresponding to a challenge Ch 2 {0, 1, 2} of a verifier, the prover reveals one out of three tuples ($r_0$, $t_1$, $e_1$), ($r_1$, $t_1$, $e_1$), and ($r_1$, $t_0$, $e_0$). The verifier can check each side of each equation (1) and (2) by using either of the three tuples. Such vectors $r_0$, $r_1$, $t_0$, $t_1$, $e_0$, $e_1$ are produced by using the dividing techniques described above. Thus, when $r_0$, $t_0$, and $e_0$ are randomly chosen, the verifier can obtain no information on the secret key s from only one out of the three tuples.

Referring to FIG. 3, communication protocol 300 is shown, with the prover's input 302 as ((F, v), s). The verifier's input 304 is (F, v). In protocol element 310, each value in tuple ($r_0$, $r_1$, $t_0$, $t_1$, $e_0$, $e_1$) is determined. In protocol element 320, each of values $c_0$, $c_1$, and $c_2$ is determined. In protocol element 330, the prover provides message 332 with values $c_0$, $c_1$, and $c_2$. In protocol block 334, the verifier selects a challenge value Ch from the set of values 0, 1, and 2, and provides the Ch value to the prover in message 336. In protocol element 340, the prover selects a response tuple depending upon the challenge value Ch and provides the response tuple to the verifier in message 342. In protocol element 350, the verifier validates the response by calculating commitment strings using the values of the response tuple received, and comparing the calculated commitment strings to the commitment strings $c_0$, $c_1$, and $c_2$ provided by the prover in message 332.

The communication protocol 300 is referred to as a three-pass protocol, because three messages are exchanged between the prover and the verifier. These three exchanges are shown by messages 332, 336, and 342.

FIG. 4 shows a second communication protocol between a prover and a verifier in performing the method of FIG. 2. Communication protocol 400 is shown, with the prover's input 402 as ((F, v), s). The verifier's input 404 is (F, v). In protocol element 410, each of values $r_0$, $r_1$, $t_0$, and $e_0$ is determined. In protocol element 420, commitment values $c_0$ and $c_1$ are determined and provided to the verifier in message 432. In protocol element 430, the verifier selects a random value alpha α, as shown in protocol element 434, and provides a in a message 436 to the prover. In protocol element 440, values for $t_1$ and $e_1$ are determined using the value α and are provided to the verifier in message 452. In protocol element 450, the verifier selects a challenge value Ch from the set of values 0 and 1, as shown in protocol element 454, and provides the Ch value to the prover in message 452. In protocol element 460, the prover selects a response value of $r_0$ or $r_1$ depending upon the challenge value Ch and provides the response to the verifier in message 462. In protocol element 460, the verifier validates the response by calculating commitment strings using the values of the response received, and comparing the calculated commitment strings to the commitment strings $c_0$ or $c_1$ provided by the prover in message 432.

The communication protocol 400 is referred to as a five-pass protocol, because five messages are exchanged between the prover and the verifier. These five exchanges are shown by messages 423, 436, 452, 456, and 462. The five-pass protocol is very similar to the three-pass protocol 300 of FIG. 3, except the verifier provides a choice (α—a random value) to be incorporated into the values for $t_1$ and $e_1$.

Sakumoto's protocols of FIGS. 3 and 4 are limited to a single prover and verifier communicating as peers in peer-to-peer communication. Therefore in the scenario shown in FIG. 1 where the endpoints (i.e. application 140 and keyboard firmware 110) have no direct means to communicate, the protocols of FIGS. 3 and 4 are not scalable and are subject to man-in-the-middle (MITM) attacks.

To address this problem, Sakumoto's multivariate quadratic polynomial public key identification schemes can be enhanced to incorporate a cascading verification that will produce a "chain of trust". The term "chain of trust" as used herein refers to an abstraction of a chain made up of "links," where each link represents a trusted component of a computing environment. The chain of trust is constructed by confirming trustworthiness of a root component of the computing system, such as immutable hardware (e.g. ROM). Since ROM only loads authenticated firmware, such as keyboard firmware, the keyboard firmware is trusted and can be used as a root component/root link of the chain of trust.

As successive components are loaded into memory of the computing system, each component is evaluated for trustworthiness. Each component that is verified as trustworthy is added as a "link" to the chain of trust. When a component is added to the chain of trust, the newly-added component/link can be considered to be linked (e.g., contain a pointer) to the component/link that confirmed the newly-added component's trustworthiness Typically, an application program is at the "top" of the chain of trust and serves as verifier for the previous component/link in the chain of trust. The enhancements to Sakumoto's public-key identification scheme to create a chain of trust do not affect the security robustness of Sakumoto's original scheme.

Each component of the computing system can be considered as a successive layer in the Open Systems Interconnection model (OSI model) of the computing system. The OSI model partitions a computing system into abstraction layers. The or Version. of the model defined seven layers, beginning at the bottom with the physical layer, which transmits and receives raw bits over a physical medium. Subsequent layers, in order, are the data link layer, the network layer, the transport layer, the session layer, the presentation layer, and the application layer.

In the OSI model, a layer serves the layer above it and is served by the layer below it. For example, a layer that provides error-free communications across a network provides the path needed by applications above it, while it calls the next lower layer to send and receive packets that comprise the contents of that path. In building the chain of trust in accordance with the inventive scheme described herein, each component may be considered as belonging to one of the OSI model layers.

Furthermore, while the components of FIG. 1 are described in the context of a computer system with privilege levels being controlled by an operating system, the techniques described herein can be used in a different type of computing environment. For example, the techniques for building a chain of trust described herein can be used in a virtualized computing environment in which a hypervisor/Virtual Machine Monitor and a hardware or software isolation mechanism controls execution of virtual machines (components) and access to resources within the computing environment.

Figure 5A:
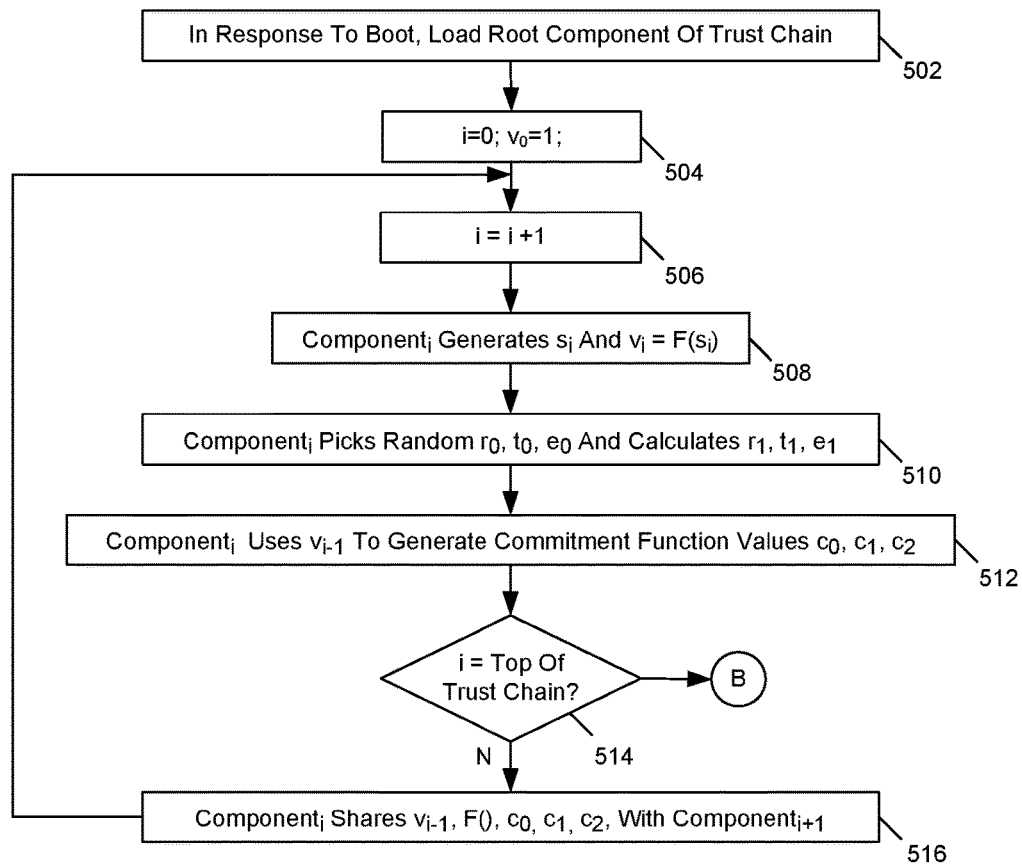
FIGS. 5A and 5B show a flowchart for building a chain of trust between components of a computing environment in accordance with an embodiment of the invention.
Figure 5B:
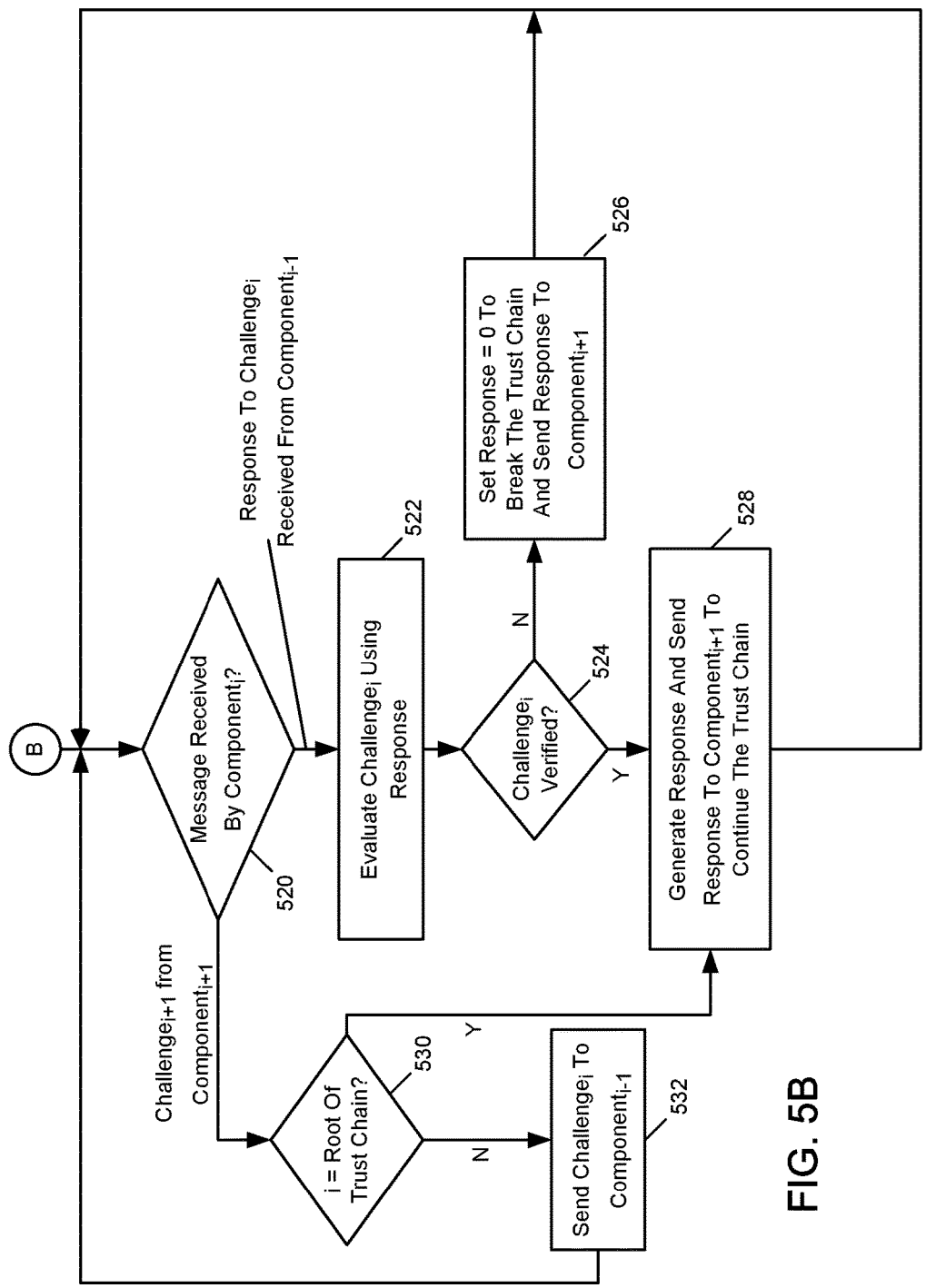

FIGS. 5A and 5B show a flowchart for building a chain of trust between components of a computing environment in accordance with an embodiment of the invention. Block 502 begins the process, where a root component of a trust chain is loaded into memory of a computer system in response to booting the computer system. The root component is described as component$_0$ of the trust chain. The root component of the trust chain is considered to be immutable and trusted.

Control proceeds to block 504, which initializes values of a variable i, which is a counter for the components of a computer system being verified, and a value of a variable $v_0$ to 1, for use in future calculations. Control proceeds to block 506, where the value of the index variable i is incremented by 1. The current component of the trust chain is indicated as component$_i$. Control proceeds to block 508, where component$_i$ generates a secret (private key) $s_i$ and a public key $v_i$ as a multivariate quadratic function F of $s_i$. Control then proceeds to block 510, where each value in tuple ($r_0$, $r_1$, $t_0$, $t_1$, $e_0$, $e_1$) is determined. Values for $r_0$, $t_0$, and $e_0$ are selected randomly, and values $r_1$, $t_1$, and $e_1$ are calculated.

Control proceeds to block 512, where component$_i$ uses the public key of the previous prover i−1, i.e., the public key of component$_{i-1}$, to generate commitment function values $c_0$, $c_1$, and $c_2$. By using the public key of the previous prover i−1, component$_i$ builds upon the trustworthiness (or lack thereof) of the previous prover i−1.

Control proceeds to decision point 514, where a determination is made whether the value of the index variable i has reached the top of the trust chain. If so, control transitions to connection point B of FIG. 5B. If the value of the index variable i has not reached the top of the trust chain, control proceeds from decision point 514 to block 516. At block 516, component$_i$ shares values $v_{i-1}$, the multivariate quadratic function F, $c_0$, $c_1$, and $c_2$ with the next component$_{i+1}$ of the trust chain. Control then returns to block 506, where the index value i is incremented to point to the next component of the trust chain.

FIG. 5B begins with connection point B (which was previously seen in FIG. 5A when the top of the trust chain was reached at decision point 514). FIG. 5B represents actions that are taken by a component$_i$ in response to messages received during construction of a trust chain. For example, a component$_i$ may receive a message at decision point 520. Depending upon the nature of the message, component$_i$ may serve as either a prover of its own trustworthiness or a verifier of a previous component's trustworthiness. If the message is a challenge$_{i+1}$ from component$_{i+1}$, component$_i$ will serve as a prover, and control proceeds to decision point 530. At decision point 530, a determination is made whether i points to the root of the trust chain. If so, as the root of the trust chain, component$_i$ is considered to be immutable and trusted. If component$_i$ is the root of the trust chain, control proceeds to block 528, where a response is generated and sent to component$_{i+1}$ to continue the trust chain.

At decision point 530, if i does not point to the root of the trust chain, component$_i$ is serving as a verifier of a previous component of the trust chain. Control proceeds to block 532, where a challenge$_i$ is sent to the previous component$_{i-1}$ of the trust chain.

At decision point 520, if a message received is a response to a challenge$_i$ that component$_i$ previously sent to component$_{i-1}$, component$_i$ is serving in the role of a verifier. Control proceeds to block 522. At block 522, challenge$_i$ is evaluated using the response from component$_{i-1}$. If challenge$_i$ is verified at decision point 524, control proceeds to block 528. At block 528, a response is generated by component$_i$ and sent to component$_{i+1}$ to continue the trust chain. Control then returns to decision point 520 to await another message.

At decision point 524, if challenge$_i$ is not verified, control proceeds to block 526. At block 526, the response is set to 0 to break the trust chain, and a response is sent to component$_{i+1}$. Control then returns to decision point 520 to await receipt of the next message.

Figure 6:
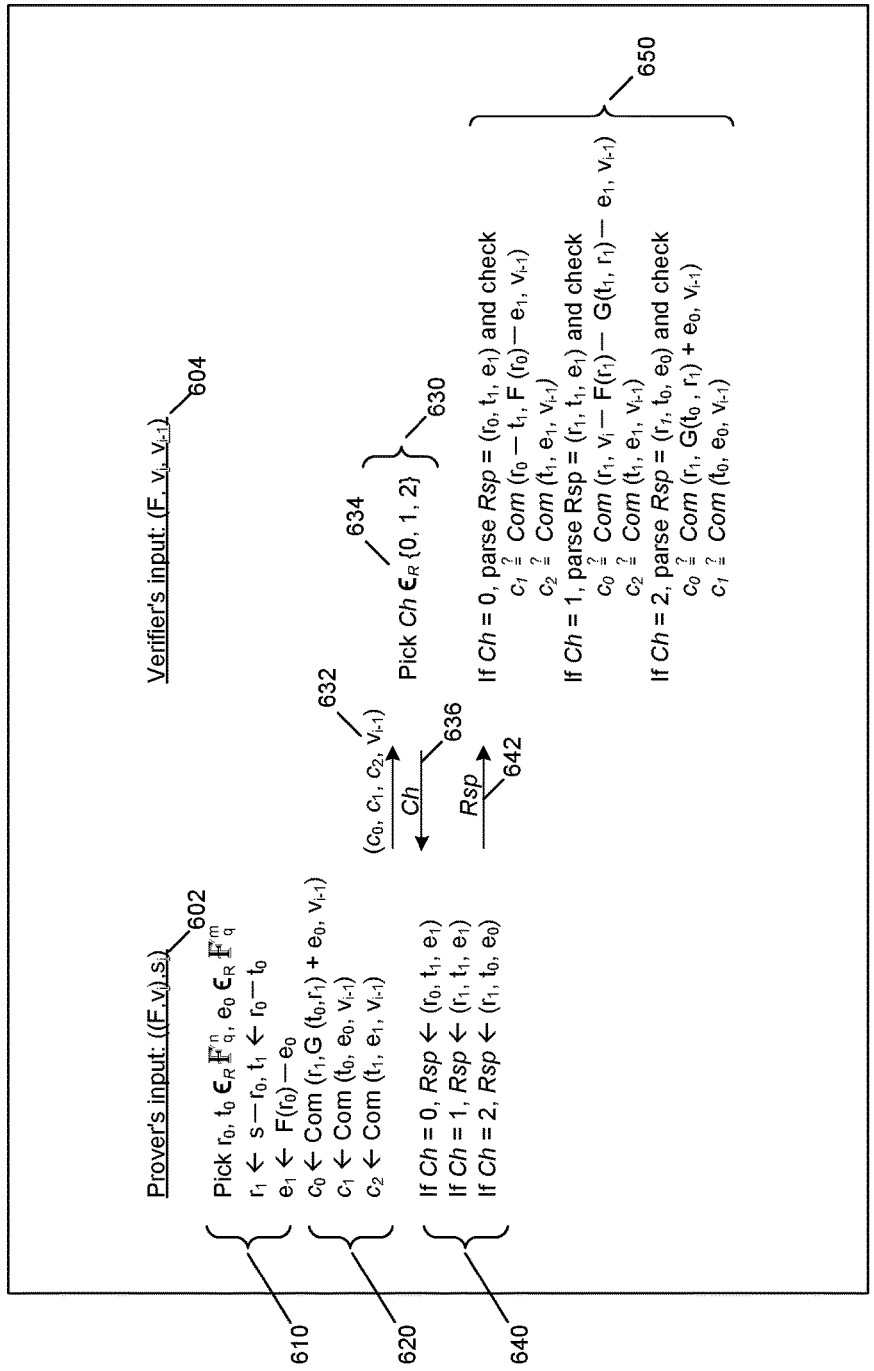
FIG. 6 shows a communication protocol between a prover and a verifier in performing the method of FIGS. 5A and 5B in accordance with an embodiment of the invention.

FIG. 6 shows a communication protocol between a prover and a verifier in performing the method of FIGS. 5A and 5B in accordance with an embodiment of the invention. Referring to FIG. 6, communication protocol 600 is shown, with the prover's input 602 as ((F, $v_i$), $s_i$). Here, the subscript i is used to represent the current prover$_i$, which has its own secret $s_i$. The public key $v_i$ is the prover's public key, calculated as $v_i$=F($s_i$). The elements of protocol 600 are performed for each component$_i$ of the computing environment in establishing the chain of trust for the computer system. The verifier's input 604 is (F, $v_i$, $v_{i-1}$), where the subscript i−1 represents the previous prover$_{i-1}$ in establishing the chain of trust for the computing environment. Therefore, the verifier receives as input not only the function F, but the public key $v_i$ for the current prover$_i$ and the public key $v_{i-1}$ for the previous prover$_{i-1}$ in the layers of components of the computer system.

In protocol element 610, each value in tuple ($r_0$, $r_1$, $t_0$, $t_1$, $e_0$, $e_1$) is determined. In protocol element 620, each of values $c_0$, $c_1$, and $c_2$ is determined. Note that for each commitment string value computed, the public key of the previous prover$_{i-1}$ is included in the calculation of the current commitment string value. In protocol element 630, the prover$_i$ provides message 632 with values $c_0$, $c_1$, and $c_2$, along with the public key $v_{i-1}$ for the previous prover$_{i-1}$. Note that it is not necessary for message 632 to include the public key $v_i$ for the current prover$_i$, as the public key $v_i$ is already known to the verifier. In protocol element 634, the verifier selects a challenge value Ch from the set of values 0, 1, and 2, and provides the Ch value to the prover$_i$ in message 636. In protocol element 640, the prover$_i$ selects a response tuple depending upon the challenge value Ch and provides the response tuple to the verifier in message 642. In protocol element 650, the verifier validates the response by calculating commitment strings using the values of the response tuple received, and comparing the calculated commitment strings to the commitment strings $c_0$, $c_1$, and $c_2$ provided by the prover$_i$ in message 632.

The process described above is repeated for each prover$_i$ in establishing a chain of trust for components of a computer system. Note that the chain of trust may be initially established upon booting the computer system, and the chain of trust may be re-verified during runtime.

Additionally, the chain of trust can be established without modifying existing components. Key generation and trust verification functions can be performed on behalf of existing components by a trusted container or sandbox that controls components of a secure computing environment. For example, a trusted container may include a hypervisor/Virtual Machine Monitor and a hardware or software isolation mechanism that runs at the highest privilege level in the computing environment.

The communication protocol 600 is referred to as a three-pass protocol, because three messages are exchanged between the prover and the verifier. These three exchanges are shown by messages 632, 636, and 642.

Figure 7:
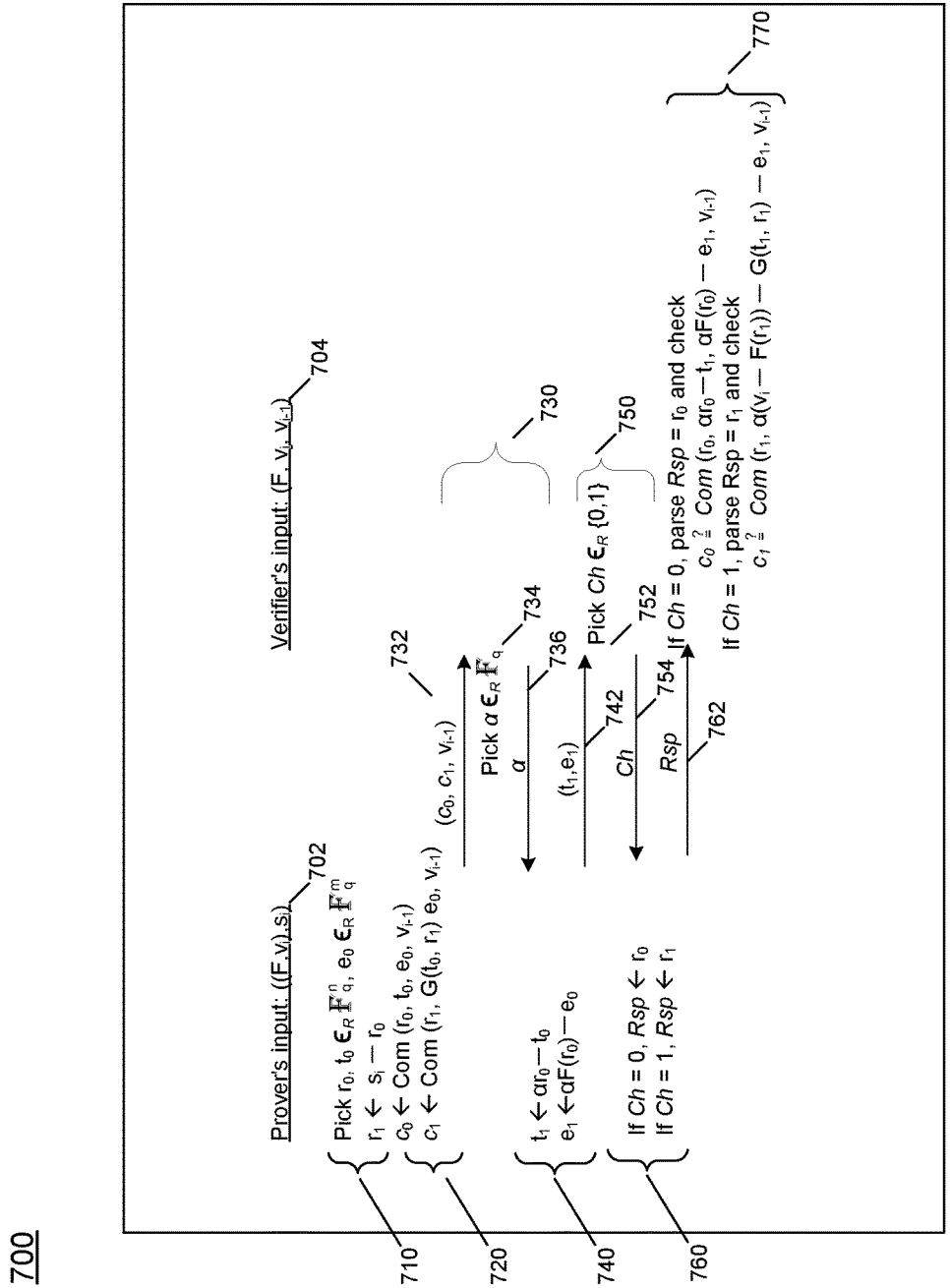
FIG. 7 shows a second communication protocol between a prover and a verifier in performing the method of FIGS. 5A and 5B in accordance with an embodiment of the invention.

FIG. 7 shows a second communication protocol between a prover and a verifier in performing the method of FIGS. 5A and 5B in accordance with one embodiment of the invention. Communication protocol 700 is shown, with the prover's input 702 as ($(F, v_i), s_i$). The verifier's input 404 is ($F, v_i, v_{i-1}$). In protocol element 710, each of values $r_0$, $r_1$, $t_0$, and $e_0$ is determined. In protocol element 720, commitment values $c_0$ and $c_1$ are determined and provided to the verifier in message 732, along with the public key $v_{i-1}$ for the previous prover$_{i-1}$. Note that it is not necessary for message 732 to include the public key $v_i$ for the current prover$_i$, as the public key $v_i$ is already known to the verifier. In protocol element 730, the verifier selects a random value alpha $\alpha$, as shown in protocol element 734, and provides a in a message 736 to the prover. In protocol element 740, values for $t_1$ and $e_1$ are determined using the value $\alpha$ and are provided to the verifier in message 742. In protocol element 750, the verifier selects a challenge value Ch from the set of values 0 and 1, as shown in protocol element 752, and provides the Ch value to the prover$_i$ in message 754. In protocol element 760, the prover selects a response value of $r_0$ or $r_1$ depending upon the challenge value Ch and provides the response to the verifier in message 762. In protocol element 770, the verifier validates the response by calculating commitment strings using the values of the response received, and comparing the calculated commitment strings to the commitment strings $c_0$ or $c_1$ provided by the prover in message 732.

The communication protocol 700 is referred to as a five-pass protocol, because five messages are exchanged between each prover and the verifier. These five exchanges are shown by messages 732, 736, 742, 754, and 762. The five-pass protocol is very similar to the three-pass protocol 700 of FIG. 6, except the verifier provides a choice ($\alpha$—a random value) to be incorporated into the values for $t_1$ and $e_1$.

FIG. 8 shows an example communication sequence between the components of the computer system of FIG. 1 in accordance with the communication protocol of FIG. 6. The columns of the table represent the verifier, application 830, and several provers, shown in the columns for middleware 840, USB driver 850, and keyword firmware 860. The rows of the table represent functions in performing the protocol of FIG. 6. The sequence shown in FIG. 8 includes a setup/boot sequence performed in rows 802 through 808. Setup/boot sequence is initially followed to establish a chain of trust when booting the computing system, and may be repeated during runtime whenever re-verification of the chain of trust is needed. The communication sequence of FIG. 8 also includes a verification sequence, which is performed in rows 812 through 822.

While each of the components of FIG. 8 is described as performing the functions of the protocol of FIG. 6, a trusted container or sandbox may perform the functions on behalf of a component running within the trusted container or sandbox. For example, a trusted container may include a hypervisor/Virtual Machine Monitor and a hardware/software isolation mechanism that runs at the highest privilege level in the system.

Referring again to FIG. 8, keyboard firmware 860 is the first component$_i$, where i=1, to be considered in establishing the chain of trust between the components. Keyboard firmware 860 can considered to be the root of the chain of trust. Application 830, where i=4, is the uppermost level of the chain of trust and serves as the verifier. Each component$_i$ is considered in turn in building the chain of trust, beginning with keyboard firmware 860, moving to USB driver 850, middleware 840, and finally, application 830.

In row 802, the index i initially has a value of 1, which indicates that component$_i$ is the root of the chain of trust. Note that the protocol 600 of FIG. 6 uses the public key for not only the current prover$_i$, but also a public key for a previous prover$_{i-1}$. Therefore, a value for the public key of the root component's previous prover$_{i-1}$, i.e., public key $v_{i-1}$, or $v_0$, is initialized to a value of one (1). Initialization of the previous prover's public key to a value of one (1) when the current component is the root of the trust chain shows that the root component$_1$ is trusted. Successive components of the computer system must iteratively prove that they can be trusted by showing that they are in possession of a tuple of values ($r_0$, $r_1$, $t_0$, $t_1$, $e_0$, $e_1$) from which the public key $F=(v_i(s_i))$ can be determined by calculating $F=(v_i(r_0+r_1))$.

In row 802, the value of i is initially set to 1. Keyboard firmware 860 determines values for its own respective secret (private key) $s_1$, public key $v_1=F(s_1)$), as well as $r_0$, $r_1$, $t_0$, $t_1$, $e_0$, and $e_1$, commitment strings $c_0$, $c_1$, and $c_2$, and a public key for the previous prover $v_{i-1}=v_0=0$. Because keyboard firmware 860 is the root of trust, $v_0$ is initialized to a value of one (1).

In row 804, keyboard firmware 860 sends the calculated commitment strings $c_0$, $c_1$, $c_2$, as well as public keys $v_i=v_1$ and $v_{i-1}=v_0$, to component$_{i+1}$, or component$_2$, USB driver 850. The value of index i, which points to the new current component$_i$, is incremented to i=i+1=2. As component$_2$ in the chain of trust, USB driver 850 generates its own respective secret (private key) $s_2$, public key $v_2=F(s_2)$), as well as its own respective values for $r_0$, $r_1$, $t_0$, $t_1$, $e_0$, and $e_1$, and commitment strings $c_0$, $c_1$, and $c_2$.

In row 806, USB driver 850 sends the following values to the next component in the chain of trust, middleware 840: USB driver 850's own generated values $c_0$, $c_1$, and $c_2$, its own public key $v_2$, and the public key for the previous prover vi-$_1$=$v_1$, which was provided to USB driver 850 by keyboard firmware 860 in row 804. The value of index i, which points to the new current component$_i$, is incremented to i=i+1=3. As component$_3$ in the chain of trust, middleware 840 generates its own respective secret (private key) $s_3$, public key $v_3=F(s_3)$), as well as its own respective values of $r_0$, $r_1$, $t_0$, $t_1$, $e_0$, and $e_1$, and commitment strings $c_0$, $c_1$, and $c_2$.

In row 808, middleware 840 sends the following values to the next component in the chain of trust, application 830: middleware 840's own generated values $c_0$, $c_1$, and $c_2$, its own public key $v_3$, and the public key for the previous prover $v_{i-1}=v_2$, which was provided to middleware 840 by USB driver 830 in row 806. The value of index i, which points to the new current component$_i$, is incremented to i=i+1=4. As component$_4$ in the chain of trust, application 830 sits at the top of the chain of trust. Rather than prove itself to another component higher in the chain of trust, application 830 serves as a verifier.

Application 830 begins the verification process in row 812. Application 830 generates a challenge ($ch_4$). Application 830 decrements i=i−1=3 to point to the next lower level of the trust chain, middleware 840, and sends challenge $ch_4$ to middleware 840 in row 812.

In row 812, middleware 840 receives the challenge $ch_4$. To respond to challenge $ch_4$, middleware 840 must attest that lower levels in the chain of trust have been verified. In row 814, middleware 840 computes its own challenge $ch_3$, either setting $ch_3$ to a new value, or reusing challenge $ch_4$ that it received from application 830. Middleware 840 decrements i=i−1=2 to point to the next lower level of the trust chain, USB driver 850, and sends challenge $ch_3$ to USB driver 850 in row 814.

In row 814, USB driver 850 receives the challenge $ch_3$. To respond to challenge $ch_3$, USB driver 850 must attest that the lower levels in the chain of trust are verified. In row 816, USB driver 850 computes its own challenge $ch_2$, either setting $ch_2$ to a new value, or reusing challenge $ch_3$ that it received from middleware 840. USB driver 850 decrements i=i−1=1 to point to the next lower level of the trust chain, keyboard firmware 860, and sends challenge $ch_2$ to component$_1$, keyboard firmware 860 in row 816.

In row 816, keyboard firmware 860 receives the challenge $ch_2$. To respond to challenge $ch_2$, keyboard firmware 860 must attest that the lower levels in the chain of trust have been verified. Keyboard firmware 860 sits at the root of the chain of trust, with index value i=1. Lower levels in the chain of trust are considered trusted, as shown above when the value of $v_{i-1}=v_0=1$ was initialized. Rather than send a further challenge, in row 818, keyboard firmware 860 computes a response $Rsp_1$ to $ch_2$ received in row 816 in accordance with protocol element 640 of FIG. 6. Response $Rsp_1$ is returned to the challenger, USB driver 850 in row 818.

In row 818, USB driver 850 receives and verifies the response $Rsp_1$ to challenge $ch_2$, using the public keys $v_1$ and $v_0$ previously received from keyboard firmware 860 in row 804. If the response $Rsp_1$ from keyboard firmware 860 is verified, keyboard firmware 860 is trusted, and a value for $Rsp_2$ is generated by USB driver 850. If response $Rsp_1$ from keyboard firmware 860 is not verified, $Rsp_2$ is set to 0, thereby breaking the chain of trust.

In row 820, middleware 840 receives response $Rsp_2$ to challenge $ch_3$ from USB driver 850. Middleware 840 then verifies the response $Rsp_2$ to challenge $ch_3$, using the public keys $v_2$ and $v_1$ previously received from USB driver 850 in row 806. If the $Rsp_2$ from USB driver 850 is verified, USB driver 850 is trusted, and a value for $Rsp_3$ is generated by middleware 840. If the $Rsp_2$ from USB driver 850 is not verified, $Rsp_3$ is set to 0, thereby breaking the chain of trust.

In row 822, application 830 receives response $Rsp_3$ to challenge $ch_4$. Application 830 then verifies the response $Rsp_3$ received to challenge $ch_4$, using the public keys $v_3$ and $v_2$ previously received from middleware 840 in row 808. If the $Rsp_3$ from middleware 840 is verified, middleware 840 is trusted, the entire chain of trust has been verified and the components are all trusted. If the $Rsp_3$ from middleware 840 is not verified, processing the chain of trust stops unsuccessfully.

FIG. 9 shows another example communication sequence between the components of the computer system of FIG. 1 in accordance with the communication protocol of FIG. 6. The columns of the table represent the verifier, application 930, and several provers, shown in the columns for middleware 940, USB driver 950, and keyword firmware 960. The rows of the table represent functions performed when executing the protocol of FIG. 6. The sequence shown in FIG. 9 includes a setup/boot sequence performed in rows 902 through 908. Setup/boot sequence is initially followed to establish a chain of trust when booting the computing system, and may be repeated during runtime whenever re-verification of the chain of trust is needed. The communication sequence of FIG. 9 also includes a verification sequence, which is performed in rows 912 through 922.

While each of the components of FIG. 9 is described as performing the functions of the protocol of FIG. 6, a trusted container or sandbox may perform the functions on behalf of a component running within the trusted container or sandbox. For example, a trusted container may include a hypervisor/Virtual Machine Monitor and a hardware/software isolation mechanism that runs at the highest privilege level in the system.

Referring again to FIG. 9, keyboard firmware 960 is the first component$_i$, where i=1, to be considered in establishing the chain of trust between the components. Keyboard firmware 960 can considered to be the root of the chain of trust. Application 930, where i=4, is the uppermost level of the chain of trust and serves as the verifier. Each component$_i$ is considered in turn in building the chain of trust, beginning with keyboard firmware 960, moving to USB driver 950, middleware 940, and finally, application 930.

In row 902, the index i initially has a value of 1, which indicates that component$_i$ is the root of the chain of trust. Note that the protocol 600 of FIG. 6 uses the public key for not only the current prover$_i$, but also a public key for a previous prover$_{i-1}$. Therefore, a value for the public key of the root component's previous prover$_{i-1}$, i.e., public key $v_{i-1}$, or $v_0$, is initialized to the value one (1). Initialization of the previous prover's public key to a value of one (1) when the current component is the root of the trust chain shows that the root component$_1$ is trusted. Subsequent components of the computing environment must iteratively prove that they can be trusted by showing that they are in possession of a tuple of values ($r_0$, $r_1$, $t_0$, $t_1$, $e_0$, $e_1$) from which the public key $F=(v_i(s_i))$ can be determined by calculating $F=(v_i(r_0+r_1))$.

In row 902, the value of i is initially set to 1. Keyboard firmware 960 determines values for its own respective secret (private key) $s_1$, public key $v_1=F(s_1)$), as well as $r_0$, $r_1$, $t_0$, $t_1$, $e_0$, and $e_1$, commitment strings $c_0$, $c_1$, and $c_2$, and a public key for the previous prover $v_{i-1}=v_0=1$. Because keyboard firmware 960 is the root of trust, $v_0$ is initialized to one (indicating that keyboard firmware 960 is trusted).

In row 904, keyboard firmware 960 sends the calculated commitment strings $c_0$, $c_1$, $c_2$, as well as public keys $v_i=v_1$ and $v_{i-1}=v_0$, to component$_{i+1}$, or component$_2$, USB driver 950. The value of index i, which points to the new current component$_i$, is incremented to i=i+1=2. As component$_2$ in the chain of trust, USB driver 950 generates its own respective its own respective secret (private key) $s_2$, public key $v_2=F(s_2)$), as well as its own respective values for $r_0$, $r_1$, $t_0$, $t_1$, $e_0$, and $e_1$, and commitment strings $c_0$, $c_1$, and $c_2$ in row 904.

In row 906, USB driver 950 sends the following values to the next component in the chain of trust, middleware 940: USB driver 950's own generated values $c_0$, $c_1$, and $c_2$, its own public key $v_2$, and the public key for the previous prover $vi_{-1}=v_1$, which was provided to USB driver 950 by keyboard firmware 960 in row 904. The value of index i, which points to the new current component$_i$, is incremented to i=i+1=3. As component$_3$ in the chain of trust, middleware 940 generates its own respective its own respective secret (private key) $s_3$, public key $v_3=F(s_3)$), as well as its own respective values of $r_0$, $r_1$, $t_0$, $t_1$, $e_0$, and $e_1$, and commitment strings $c_0$, $c_1$, and $c_2$ at row 906.

In row 908, middleware 940 sends the following values to the next component in the chain of trust, application 930: middleware 940's own generated values $c_0$, $c_1$, and $c_2$, its own public key $v_3$, and the public key for the previous prover $v_{i-1}=v_2$, which was provided to middleware 940 by USB driver 930 in row 906. The value of index i, which points to the new current component$_i$, is incremented to i=i+1=4. As component$_4$ in the chain of trust, application 930 sits at the top of the chain of trust. Rather than prove itself to another component higher in the chain of trust, application 930 serves as a verifier.

Application 930 begins the verification process in row 912. Application 930 generates a challenge (ch$_4$). In this example, challenge ch$_4$ is set to a value of 1. Application 930 decrements i=i−1=3 to point to the next lower level of the trust chain, middleware 940, and sends challenge ch$_4$ to middleware 940.

In row 912, middleware 940 receives the challenge ch$_4$. To respond to challenge ch$_4$, middleware 940 must attest that the lower levels in the chain of trust have been verified. In row 914, middleware 940 computes its own challenge ch$_3$, reusing challenge ch$_4$=1 that it received from application 930. Middleware 940 decrements i=i−1=2 to point to the next lower level of the trust chain, USB driver 950, and sends challenge ch$_3$=1 to USB driver 950.

In row 914, USB driver 950 receives the challenge ch$_3$. To respond to challenge ch3, USB driver 950 must attest that the lower levels in the chain of trust have been verified. In row 916, USB driver 950 computes its own challenge ch$_2$, reusing challenge ch$_3$=1 that it received from middleware 940 at row 914. USB driver 950 decrements i=i−1=1 to point to the next lower level of the trust chain, keyboard firmware 960, and sends challenge ch$_2$ to component$_1$, keyboard firmware 960.

In row 916, keyboard firmware 960 receives the challenge ch$_2$. To respond to challenge ch$_2$, keyboard firmware 960 must attest that the lower levels in the chain of trust have been verified. Keyboard firmware 960 sits at the root of the chain of trust, and is therefore trusted, having the value of $v_{i-1}=v_0=1$.

In row 918, keyboard firmware 960 computes a response Rsp$_1$ to ch$_2$ received in row 916, which is returned to the challenger, USB driver 950. Because ch$_2$=1, in accordance with protocol element 640 of FIG. 6, Rsp$_1$ is calculated as the tuple of values ($r_1$, $t_1$, $e_1$).

USB driver 950 verifies the response Rsp$_1$ ($r_1$, $t_1$, $e_1$) received to challenge ch$_2$, using the public keys $v_1$ and $v_0$ previously received from keyboard firmware 960 in row 904. In this example, because ch$_2$=1, Rsp$_1$ is verified according to the following functions performed during execution of protocol element 650 of FIG. 6:

$$1fCh=1, \text{parse } Rsp_1=(r_1,t_1,e_1) \text{ and check}$$

$$c_0?=\text{Com}(r_1,v_1-F(r_1)-G(t_1,r_1)-e_1,v_0)$$

$$c_2?=\text{Com}(t_1,e_1,v_0)$$

Note that the commitment strings for verifying Rsp$_1$ are calculated using the previous prover's (keyboard firmware 960's) public key $v_0$. In one embodiment, commitment string function Com is implemented as a hash function, such as a Secure Hash Algorithm (SHA) (e.g., SHA2 or SHA3).

In row 918, if the Rsp$_1$ from keyboard firmware 960 is verified, keyboard firmware 960 is trusted. If the Rsp$_1$ from keyboard firmware 960 is not verified, Rsp$_2$ is set to 0, thereby breaking the chain of trust.

In row 918, if the Rsp$_1$ from keyboard firmware 960 is verified, a value for Rsp$_2$ is generated by USB driver 950. Because ch$_2$=1, in accordance with protocol element 640 of FIG. 6, Rsp$_2$ is calculated as the tuple of values ($r_1$, $t_1$, $e_1$).

In row 920, USB driver 950 sends the response Rsp$_2$=($r_1$, $t_1$, $e_1$) to middleware 940. Middleware 940 then verifies the response Rsp$_2$ ($r_1$, $t_1$, $e_1$) received to challenge ch$_1$, using the public keys $v_2$ and $v_1$ previously received from USB driver 950 in row 906. In this example, because ch$_3$=1, Rsp$_2$ is verified according to protocol element 650 of FIG. 6:

$$1fCh=1, \text{parse } Rsp_2=(r_1,t_1,e_1) \text{ and check}$$

$$c_0?=\text{Com}(r_1,v_2-F(r_1)-G(t_1,r_1)-e_1,v_1)$$

$$c_2?=\text{Com}(t_1,e_1,v_1)$$

Note that the commitment strings for verifying Rsp$_2$ are calculated using the previous prover's (USB driver 950's) public key $v_1$.

In row 920, if the Rsp$_2$ from USB driver 950 is not verified, Rsp$_3$ is set to 0, thereby breaking the chain of trust.

In row 922, middleware 940 sends response Rsp$_3$ to challenge ch$_4$ to the challenger, application 930. Application 930 then verifies the response Rsp$_3$ received to challenge ch$_4$, using the public keys $v_3$ and $v_2$ previously received from middleware 940 in row 908. If the Rsp$_3$ from middleware 940 is verified, middleware 940 is trusted. At this point, the entire chain of trust has been verified and the components are all trusted. If the Rsp$_3$ from middleware 940 is not verified, processing the chain of trust stops unsuccessfully.

Figure 10:
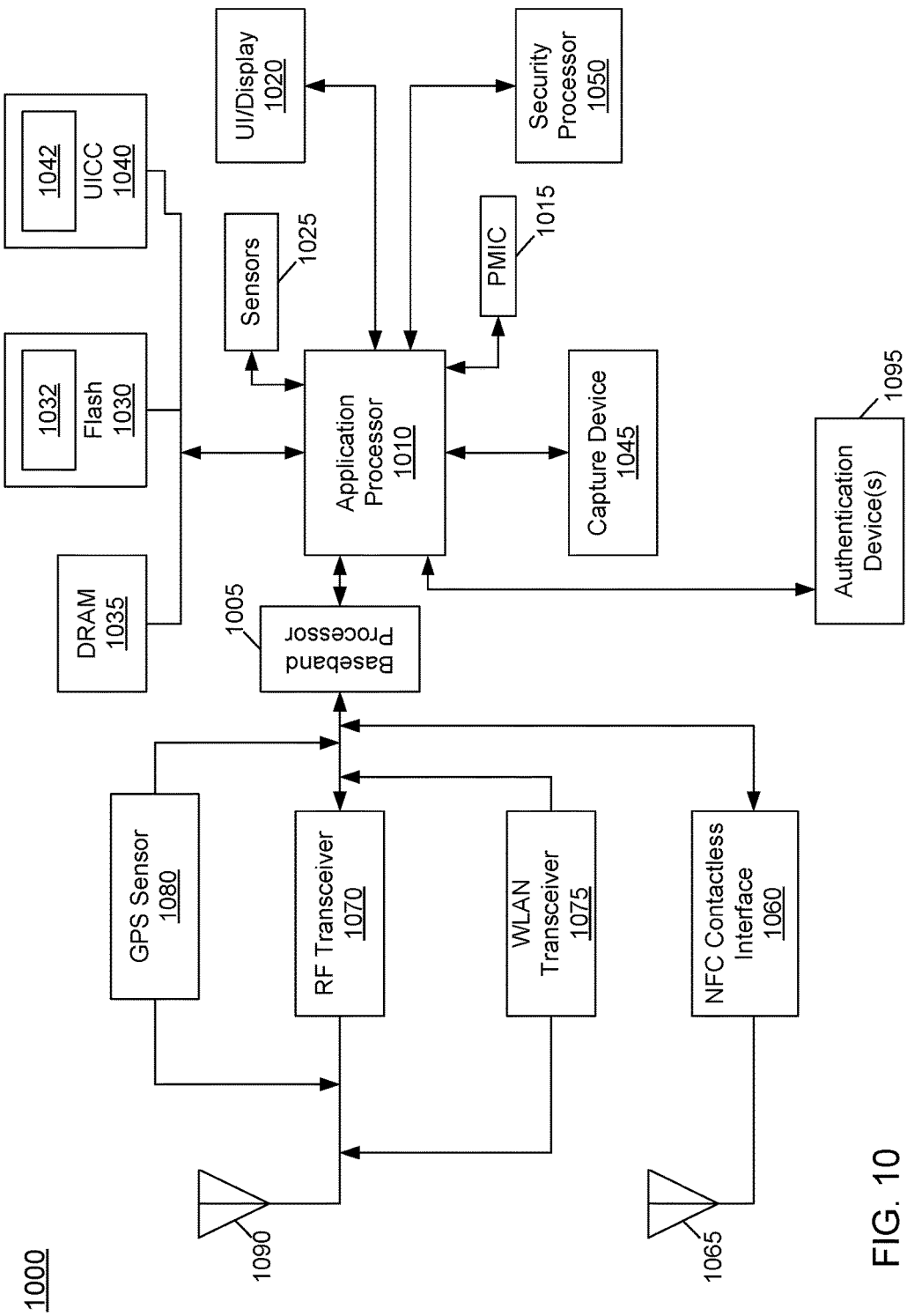
FIG. 10 is a diagram showing a system that can be used to implement an embodiment.

Referring now to FIG. 10, shown is a block diagram of an example system with which embodiments can be used. As seen, system 1000 may be a smartphone or other wireless communicator or any other IoT device. A baseband processor 1005 is configured to perform various signal processing with regard to communication signals to be transmitted from or received by the system. In turn, baseband processor 1005 is coupled to an application processor 1010, which may be a main CPU of the system to execute an OS and other system software, in addition to user applications such as many well-known social media and multimedia applications. Application processor 1010 may further be configured to perform a variety of other computing operations for the device.

In turn, application processor 1010 can couple to a user interface/display 1020, e.g., a touch screen display. In addition, application processor 1010 may couple to a memory system including a non-volatile memory, namely a flash memory 1030 and a system memory, namely a DRAM 1035. In some embodiments, flash memory 1030 may include a secure portion 1032 in which keys, other secrets and other sensitive information may be stored and operated. One or more of these storages may store instructions for performing the chain of trust protocols described herein. As further seen, application processor 1010 also couples to a capture device 1045 such as one or more image capture devices that can record video and/or still images.

Still referring to FIG. 10, a universal integrated circuit card (UICC) 1040 comprises a subscriber identity module, which in some embodiments includes a secure storage 1042 to store secure identity information. System 1000 may further include a security processor 1050 that may that may implement a trusted execution environment (TEE), and which may couple to application processor 1010. Furthermore, application processor 1010 may implement a secure mode of operation, such as Intel® Software Guard Extensions (SGX) to a given instruction set architecture, and circuitry for hosting of a trusted execution environment (TEE). Security processor 1050 and/or application processor 1010 may be configured to participate in the chain of trust protocols described herein. A plurality of sensors 1025, including one or more multi-axis accelerometers may couple to application processor 1010 to enable input of a variety of sensed information such as motion and other environmental information. In addition, one or more authentication devices 1095 may be used to receive, e.g., user biometric input for use in authentication operations.

As further illustrated, a near field communication (NFC) contactless interface 1060 is provided that communicates in a NFC near field via an NFC antenna 1065. While separate antennae are shown in FIG. 10, understand that in some implementations one antenna or a different set of antennae may be provided to enable various types of wireless functionality.

A power management integrated circuit (PMIC) 1015 couples to application processor 1010 to perform platform level power management. To this end, PMIC 1015 may issue power management requests to application processor 1010 to enter certain low power states as desired. Furthermore, based on platform constraints, PMIC 1015 may also control the power level of other components of system 1000.

To enable communications to be transmitted and received such as in one or more IoT networks, various circuitry may be coupled between baseband processor 1005 and an antenna 1090. Specifically, a radio frequency (RF) transceiver 1070 and a wireless local area network (WLAN) transceiver 1075 may be present. In general, RF transceiver 1070 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1080 may be present, with location information being provided to security processor 1050, which may be used in certain security operations. Other wireless communications such as receipt or transmission of radio signals, e.g., AM/FM and other signals may also be provided. In addition, via WLAN transceiver 1075, local wireless communications, such as according to a Bluetooth™ or IEEE 802.11 standard can also be realized.

Figure 11:
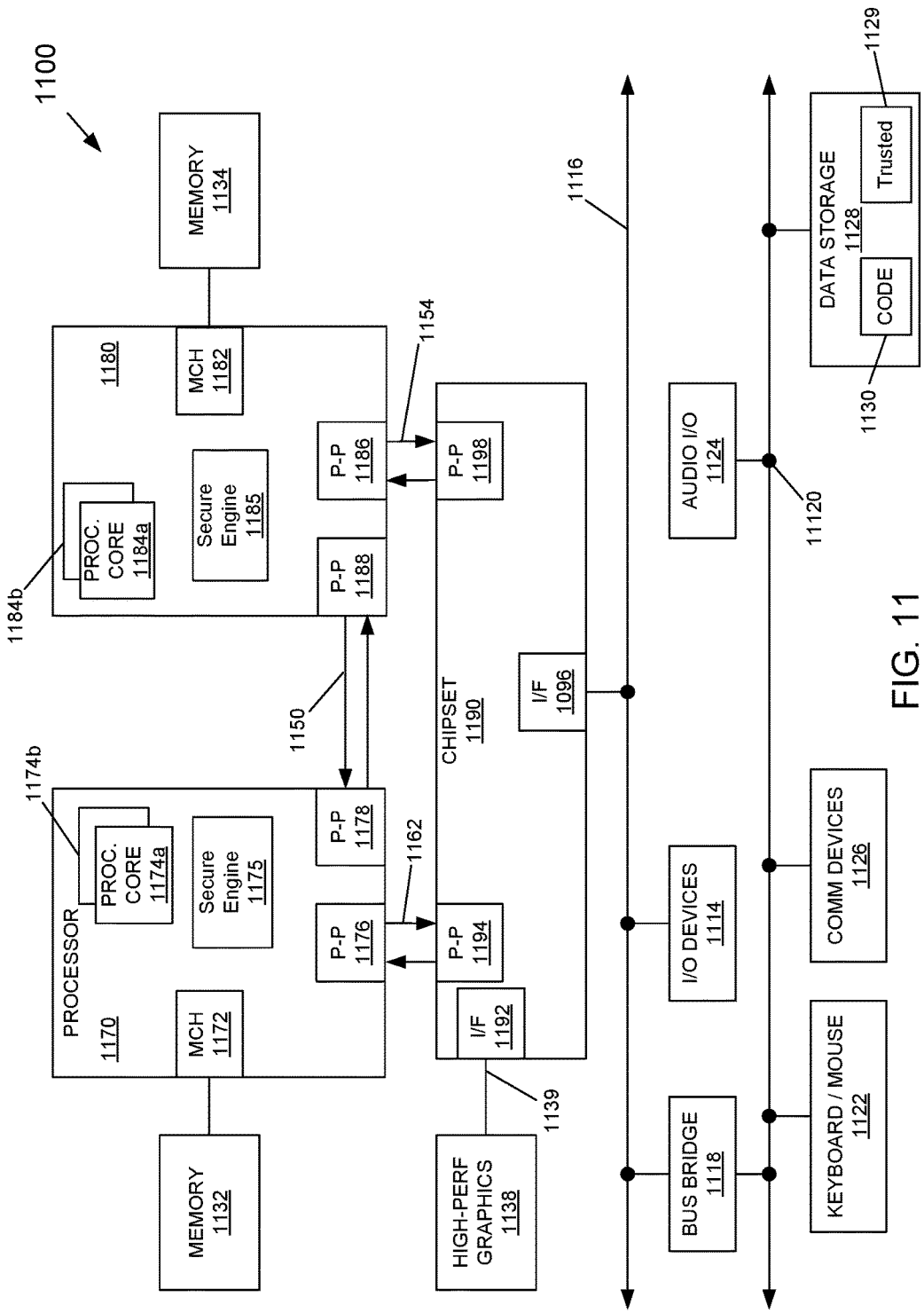
FIG. 11 is a diagram showing a system that can be used to implement an embodiment.

Referring now to FIG. 11, shown is a block diagram of a system in accordance with another embodiment. As shown in FIG. 11, multiprocessor system 1100 may be implemented as a point-to-point interconnect system such as a server system. System 1100 includes a first processor 1170 and a second processor 1180 coupled via a point-to-point interconnect 1150. As shown in FIG. 11, each of processors 1170 and 1180 may be multicore processors such as SoCs, including first and second processor cores (i.e., processor cores 1174a and 1174b and processor cores 1184a and 1184b), although potentially many more cores may be present in the processors. In addition, processors 1170 and 1180 each may include a secure engine 1175 and 1185 to perform the public/private key identification protocols as described herein.

Still referring to FIG. 11, first processor 1170 further includes a memory controller hub (MCH) 1172 and point-to-point (P-P) interfaces 1176 and 1178. Similarly, second processor 1180 includes a MCH 1182 and P-P interfaces 1186 and 1188. As shown in FIG. 11, MCH's 1172 and 1182 couple the processors to respective memories, namely a memory 1132 and a memory 1134, which may be portions of main memory (e.g., a DRAM) locally attached to the respective processors. First processor 1170 and second processor 1180 may be coupled to a chipset 1190 via P-P interconnects 1152 and 1154, respectively. As shown in FIG. 11, chipset 1190 includes P-P interfaces 1194 and 1198.

Furthermore, chipset 1190 includes an interface 1192 to couple chipset 1190 with a high performance graphics engine 1138, by a P-P interconnect 1139. In turn, chipset 1190 may be coupled to a first bus 1116 via an interface 1196. As shown in FIG. 11, various input/output (I/O) devices 1114 may be coupled to first bus 1116, along with a bus bridge 1118 which couples first bus 1116 to a second bus 1120. Various devices may be coupled to second bus 1120 including, for example, a keyboard/mouse 1122, communication devices 1126 and a data storage unit 1128 such as a non-volatile storage or other mass storage device. As seen, data storage unit 1128 may include code 1130, in one embodiment, including code for performing the chain of trust protocols described herein. As further seen, data storage unit 1128 also includes a trusted storage 1129 to store sensitive information to be protected. Further, an audio I/O 1124 may be coupled to second bus 1120.

Figure 12:
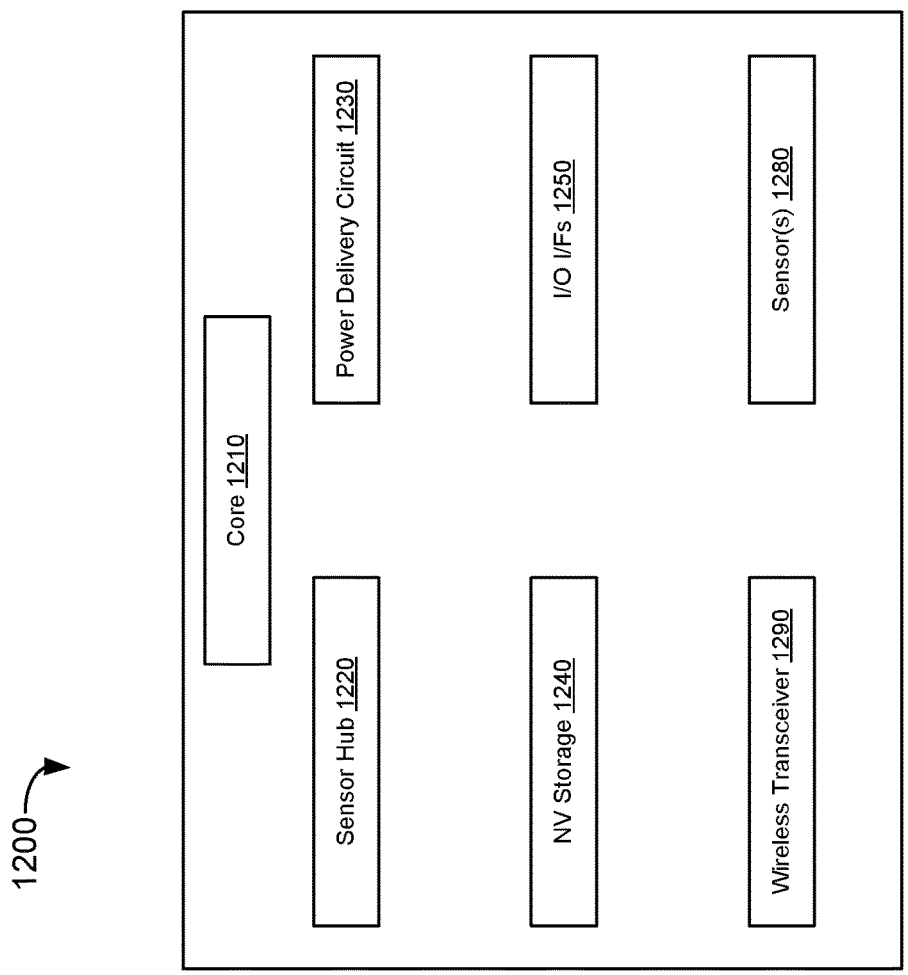
FIG. 12 is a diagram showing a system that can be used to implement an embodiment.

Embodiments may be used in environments where IoT devices may include wearable devices or other small form factor IoT devices such as an actuator and/or sensor. Referring now to FIG. 12, shown is a block diagram of a module 1200 in accordance with another embodiment. In one particular implementation, module 1200 may be an Intel® Curie™ module that includes multiple components adapted within a single small module. Module 1200 may be configured to participate in the chain of trust protocols with minimal overhead, as described herein. As seen, module 1200 includes a core 1210 (of course in other embodiments more than one core may be present). Such core may be a relatively low complexity in-order core, such as based on an Intel Architecture® Quark™ design. In some embodiments, core 1210 may implement a trusted execution environment (TEE). Core 1210 couples to various components including a sensor hub 1220, which may be configured to interact with a plurality of sensors 1280, such as one or more biometric, motion or other sensors. A power delivery circuit 1230 is present, along with a non-volatile storage 1240. In an embodiment, this circuit may include a rechargeable battery and a recharging circuit, which may in one embodiment receive charging power wirelessly. One or more input/output (IO) interfaces 1250, such as one or more interfaces compatible with one or more of USB/SPI/I²C/GPIO protocols, may be present. In addition, a wireless transceiver 1290, which may be a Bluetooth™ low energy or other short-range wireless transceiver is present to enable wireless communications as described herein. Understand that in different implementations an IoT module can take many other forms, that have, in comparison with a typical general purpose CPU or a GPU, a small form factor, low power requirements, limited instruction sets, relatively slow computation throughput, or any of the above.

The following Examples pertain to further embodiments.

In Example 1, a system to establish a chain of trust between components of a computing environment includes: at least one hardware processor to execute instructions; and at least one storage medium including instructions that when executed by the processor enable the system to generate a respective public/private key pair for each component of a plurality of components of a computing environment using a multivariate quadratic function F, determine a first commitment value and a second commitment value for a first component of the plurality of components using a public key of a respective public/private key pair for a previous component, and provide the first commitment value, the second commitment value and the public key of the previous component to a verifier in response to a challenge from the verifier.

In Example 2, the at least one storage medium further comprises instructions that when executed enable the system to determine at least one of the first and second commitment values for the first component using a polar function G, wherein the polar function G is a polar form of the multivariate quadratic function F.

In Example 3, the at least one storage medium further comprises instructions that when executed enable the system to calculate the first and second commitment values as a hash function of at least the public key of the previous component.

In Example 4, the at least one storage medium further comprises instructions that when executed enable the system to add the component to a chain of trust for the computing environment if the first and second commitment values are equal to a first expected commitment value and a second expected commitment value.

In Example 5, the at least one storage medium further comprises instructions that when executed enable the system to break a chain of trust for the computing environment if the first and second commitment values are not equal to a first expected commitment value and a second expected commitment value.

In Example 6, a method to establish a chain of trust between components of a computing environment includes generating a public/private key pair for each component of a plurality of components of a computing environment, where each public/private key pair is generated using a multivariate quadratic function F; and providing a response from a first component of the plurality of components to a challenge from a second component of the plurality of components, where the response comprises at least a first commitment value and a second commitment value, where each of the first and second commitment values is determined using a public key of a respective public/private key pair of a third component of the plurality of components.

In Example 7, the method of Example 6 further includes: adding the first component to a chain of trust for the computing environment if the first commitment value is equal to a first expected commitment value and the second commitment value is equal to a second expected commitment value; and breaking the chain of trust for the computing environment if the first commitment value does not equal the first expected commitment value or the second commitment value does not equal the second expected commitment value.

In Example 8, the method of one or more of the above Examples further includes: determining at least one of the first and second commitment values for the first component using a polar function G, where the polar function G is a polar form of the multivariate quadratic function F.

In Example 9, the third component of one or more of the above Examples has provided a previous response to a previous challenge from the first component.

In Example 10, the first and second commitment values of one or more of the above Examples are determined as a hash function of at least the public key of the third component.

In Example 11, the first expected commitment value and the second expected commitment value of one or more of the above Examples are provided by the first component to the second component prior to receiving the challenge from the second component.

In Example 12, providing the response from the first component comprises providing the response on behalf of the first component by a trusted container or sandbox within the computing environment.

In Example 13, a method to establish a chain of trust between components of a computing environment includes: generating a secret key $s_i$ for a component $i$ of the computing environment; calculating a public key $v_i$, where the public key $v_i$ is a multivariate quadratic function F of the secret key $s_i$, where $v_i=F(s_i)$, i represents a current prover i, and $v_i$ is a public key for the current prover i; determining a value for each element of a tuple (r0, r1, t0, t1, e0, e1) using the secret key $s_i$, the multivariate quadratic function F, and a polar function G, where the polar function G is a polar form of the multivariate quadratic function F; calculating a first commitment value and a second commitment value, where calculating the first and second commitment values comprises using a string commitment function, at least one element of the tuple (r0, r1, t0, t1, e0, e1) and a public key $v_{i-1}$, where i-1 represents a previous prover i-1, $v_{i-1}$ is a public key for the previous prover i-1, and $v_{i-1}$ is determined as the multivariate quadratic function F of a corresponding secret key for the previous prover i-1; and providing the public key $v_{i-1}$ and the first and second commitment values to a verifier.

In Example 14, the method of Example 13 further includes: providing a second tuple containing values for selected elements of the tuple (r0, r1, t0, t1, e0, e1) in response to a challenge from the verifier, where the verifier uses the public key $v_{i-1}$ to verify the current prover i if a first expected value matches one of the first and second commitment values, and a second expected value matches another one of the first and second commitment values.

In Example 15, at least one of the first and second commitment values of one or more of any of the above Examples is determined using a polar function G, where the polar function G is a polar form of the multivariate quadratic function F.

In Example 16, the component of one or more of any of the above Examples is added to a chain of trust for the computing environment if the first and second commitment values are equal to a first expected commitment value and a second expected commitment value.

In Example 17, the component of one or more of any of the above Examples is not added to a chain of trust for the computing environment if the first and second commitment values do not equal a first expected commitment value and a second expected commitment value.

In Example 18, An apparatus to establish a chain of trust between components of a computing environment includes: means for generating a public/private key pair for each component of a plurality of components of a computing environment, where each public/private key pair is generated using a multivariate quadratic function F; and means for providing a response from a first component of the plurality of components to a challenge from a second component of the plurality of components, where the response comprises at least a first commitment value and a second commitment value, where each of the first and second commitment values is determined using a public key of a respective public/private key pair of a third component of the plurality of components.

In Example 19, the apparatus of Example 18 further includes: means for adding the first component to a chain of trust for the computing environment if the first commitment value is equal to a first expected commitment value and the second commitment value is equal to a second expected commitment value; and means for breaking the chain of trust for the computing environment if the first commitment value does not equal the first expected commitment value or the second commitment value does not equal the second expected commitment value.

In Example 20, the apparatus of one or more of any of the above Examples further includes: means for determining at least one of the first and second commitment values for the first component using a polar function G, where the polar function G is a polar form of the multivariate quadratic function F.

In Example 21, the third component of one or more of any of the above Examples has provided a previous response to a previous challenge from the first component.

In Example 22, the first and second commitment values of one or more of any of the above Examples are determined as a hash function of at least the public key of the third component.

In Example 23, the first expected commitment value and the second expected commitment value of one or more of any of the above Examples are provided by the first component to the second component prior to receiving the challenge from the second component.

In another Example, a computer-readable medium including instructions is to perform the method of any one of Examples 6-12 or 13-17.

In another Example, an apparatus is to perform the method of any one of claim 6-12 or 13-17.

Understand that various combinations of the above Examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
at least one hardware processor to execute instructions;
at least one non-transitory storage medium including instructions that when executed by the processor enable the system to generate a respective public/private key pair for each component of a plurality of components of a computing environment using a multivariate quadratic function F, determine a first commitment value and a second commitment value for a first component of the plurality of components in the first component using a public key of a respective public/private key pair for a previous component, including to determine at least one of the first and second commitment values for the first component using a polar function G, wherein the polar function G is a polar form of the multivariate quadratic function F, provide the first commitment value, the second commitment value and the public key of the respective public/private key pair for the previous component to a verifier in response to a challenge from the verifier, and add the first component to a chain of trust for the computing environment if the first commitment value is equal to a first expected commitment value and the second commitment value is equal to a second expected commitment value.

2. The system of claim 1, wherein
the at least one non-transitory storage medium further comprises instructions that when executed enable the system to calculate the first and second commitment values as a hash function of at least the public key of the previous component.

3. The system of claim 1, wherein
the at least one non-transitory storage medium further comprises instructions that when executed enable the system to break the chain of trust for the computing environment if the first and second commitment values are not equal to the first expected commitment value and the second expected commitment value.

4. At least one non-transitory computer-readable medium comprising instructions that, when executed by a processor, cause a computing system to:
generate a respective public/private key pair for each component of a plurality of components of a computing environment, wherein each respective public/private key pair is generated using a multivariate quadratic function F;
provide a response from a first component of the plurality of components to a challenge from a second component of the plurality of components, wherein the response comprises at least a first commitment value and a second commitment value, wherein each of the first and second commitment values is determined using a public key of a respective public/private key pair of a third component of the plurality of components, and at least one of the first and second commitment values is determined using a polar function G, wherein the polar function G is a polar form of the multivariate quadratic function F; and add the first component to a chain of trust for the computing environment if the first commitment value is equal to a first expected commitment value and the second commitment value is equal to a second expected commitment value.

5. The at least one non-transitory computer-readable medium of claim 4, wherein
the third component has provided a previous response to a previous challenge from the first component.

6. The at least one non-transitory computer-readable medium of claim 4, wherein
the first and second commitment values are determined as a hash function of at least the public key of the respective public/private key pair of the third component.

7. The at least one non-transitory computer-readable medium of claim 4, wherein the first expected commitment value and the second expected commitment value are provided by the first component to the second component prior to receiving the challenge from the second component.

8. The at least one non-transitory computer-readable medium of claim 4, wherein
the first component is not added to the chain of trust for the computing environment if the first commitment value does not equal the first expected commitment value or the second commitment value does not equal the second expected commitment value.

9. The at least one non-transitory computer-readable medium of claim 4, wherein
providing the response from the first component comprises providing the response on behalf of the first component by a trusted container or sandbox within the computing environment.

10. At least one non-transitory computer-readable medium comprising instructions that, when executed by a processor, cause a computing system to:
generate a secret key $s_i$ for a component, of a computing environment;
calculate a public key $v_i$, wherein the public key $v_i$ is a multivariate quadratic function F of the secret key $s_i$, wherein v $F(s_i)$, i represents a current prover i, and $v_i$ is a public key for the current prover i;
determine a value for each element of a tuple using the secret key $s_i$ the multivariate quadratic function F, and a polar function G, wherein the polar function G is a polar form of the multivariate quadratic function F;
calculate a first commitment value and a second commitment value, wherein calculating the first and second commitment values comprises using a string commitment function, at least one element of the tuple and a public key $v_{i-1}$, wherein i-1 represents a previous prover i-1, $v_{i-1}$ is a public key for the previous prover i-1, and $v_{i-1}$ is determined as the multivariate quadratic function F of a corresponding secret key for the previous prover i-1;

provide the public key $v_{i-1}$ and the first and second commitment values to a verifier; and
add the component to a chain of trust for the computing environment if the first and second commitment values are equal to a first expected commitment value and a second expected commitment value.

11. The at least one non-transitory computer-readable medium of claim 10, wherein the instructions further cause the computing system to:
provide a second tuple containing values for selected elements of the tuple in response to a challenge from the verifier;
wherein the verifier uses the public key $v_{i-1}$ to verify the current prover i if a first expected value matches one of the first and second commitment values, and a second expected value matches another one of the first and second commitment values.

12. The at least one non-transitory computer-readable medium of claim 10, wherein
at least one of the first and second commitment values is determined using the polar function G.

13. The at least one non-transitory computer-readable medium of claim 10, wherein
the component, is not added to the chain of trust for the computing environment if the first and second commitment values do not equal the first expected commitment value and the second expected commitment value.

14. A method comprising:
generating, in a computing system, a public/private key pair for each component of a plurality of components of the computing system, wherein each public/private key pair is generated using a multivariate quadratic function F;
providing a response from a first component of the plurality of components to a challenge from a second component of the plurality of components, wherein the response comprises at least a first commitment value and a second commitment value, wherein each of the first and second commitment values is determined using a public key of a respective public/private key pair of a third component of the plurality of components and at least one of the first and second commitment values for the first component is determined using a polar function G, wherein the polar function G is a polar form of the multivariate quadratic function F; and
adding the first component to a chain of trust for the computing system if the first commitment value is equal to a first expected commitment value and the second commitment value is equal to a second expected commitment value.

15. The method of claim 14, further comprising:
breaking the chain of trust for the computing environment if the first commitment value does not equal the first expected commitment value or the second commitment value does not equal the second expected commitment value.

* * * * *